United States Patent
Ishida

(10) Patent No.: US 10,545,656 B2
(45) Date of Patent: Jan. 28, 2020

(54) INFORMATION PROCESSING APPARATUS AND DISPLAY CONTROLLING METHOD FOR DISPLAYING AN ITEM IN A DISPLAY AREA IN RESPONSE TO MOVEMENT

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 15/880,240

(22) Filed: Jan. 25, 2018

(65) Prior Publication Data

US 2018/0217731 A1    Aug. 2, 2018

(30) Foreign Application Priority Data

Jan. 31, 2017    (JP) .................................. 2017-016211

(51) Int. Cl.
*G06F 3/0486*    (2013.01)
*G06F 3/0481*    (2013.01)
*G06F 3/0482*    (2013.01)

(52) U.S. Cl.
CPC .......... *G06F 3/0486* (2013.01); *G06F 3/0482* (2013.01); *G06F 3/04817* (2013.01)

(58) Field of Classification Search
CPC ............................ G06F 3/0486; H04N 1/00196
See application file for complete search history.

(56) References Cited

U.S. PATENT DOCUMENTS

| | | | | |
|---|---|---|---|---|
| 2006/0048069 A1* | 3/2006 | Igeta | ..................... | G06F 3/0486 715/769 |
| 2006/0050301 A1* | 3/2006 | Satomi | ................... | G06F 3/1209 358/1.15 |
| 2008/0180457 A1* | 7/2008 | Yamazaki | ............. | G06F 3/0482 345/619 |
| 2012/0079432 A1* | 3/2012 | Lee | ....................... | G06F 3/0483 715/838 |
| 2016/0034325 A1* | 2/2016 | Duan | .................... | G06F 3/0486 715/769 |
| 2017/0337159 A1* | 11/2017 | Hiraishi | ................ | G06F 3/0482 |

FOREIGN PATENT DOCUMENTS

| | | |
|---|---|---|
| JP | 2006-072858 A | 3/2006 |
| JP | 2013-544385 A | 12/2013 |
| JP | 2014-071724 A | 4/2014 |
| JP | 2016-115337 A | 6/2016 |
| WO | 2011/122401 A1 | 10/2011 |

* cited by examiner

*Primary Examiner* — Roland J Casillas
(74) *Attorney, Agent, or Firm* — Canon U.S.A., Inc. IP Division

(57) ABSTRACT

An information processing apparatus includes a display control unit that displays a thumbnail list of a plurality of pages in a first display area of a display unit and displays a page corresponding to a thumbnail selected in the thumbnail list displayed in the first display area in a second display area of the display unit, and a movement control unit that moves an item in response to a drag operation, wherein the movement control unit moves an item in a first page displayed in the second display area to a thumbnail corresponding to a second page that is different from the first page in the thumbnail list displayed in the first display area in response to a drag operation, and thus the display control unit displays the second page in the second display area.

15 Claims, 27 Drawing Sheets

FIG.7

| IMAGE ID | IMAGE CAPTURING DATE AND TIME | FOCUS | NUMBER OF FACES | INDIVIDUAL ID | | | | | | | |
|---|---|---|---|---|---|---|---|---|---|---|---|
| | | | | 1 | | 2 | | 3 | | ... | |
| | | | | UPPER LEFT POSITION | LOWER RIGHT POSITION | UPPER LEFT POSITION | LOWER RIGHT POSITION | UPPER LEFT POSITION | LOWER RIGHT POSITION | | |
| 1 | 2015/7/1 10h 11m 12s | ○ | 6 | 40, 40 | 65, 65 | 90, 40 | 115, 65 | 10, 20 | 25, 35 | ... | |
| 2 | 2015/7/1 10h 12m 30s | ○ | 2 | 50, 100 | 100, 150 | 150, 125 | 190, 165 | 150, 125 | 190, 165 | ... | |
| 3 | 2015/7/1 10h 15m 54s | ○ | 0 | — | — | — | — | — | — | ... | |
| ... | ... | ... | ... | ... | ... | ... | ... | ... | ... | ... | |

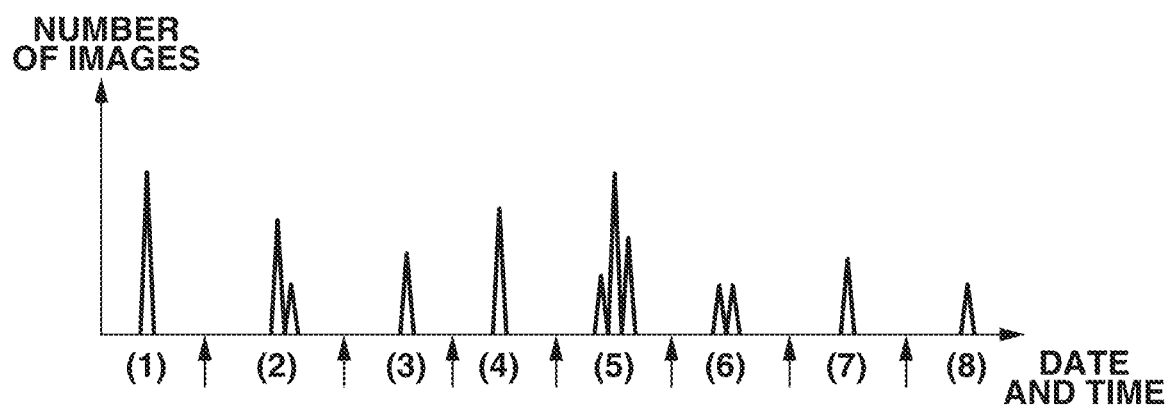
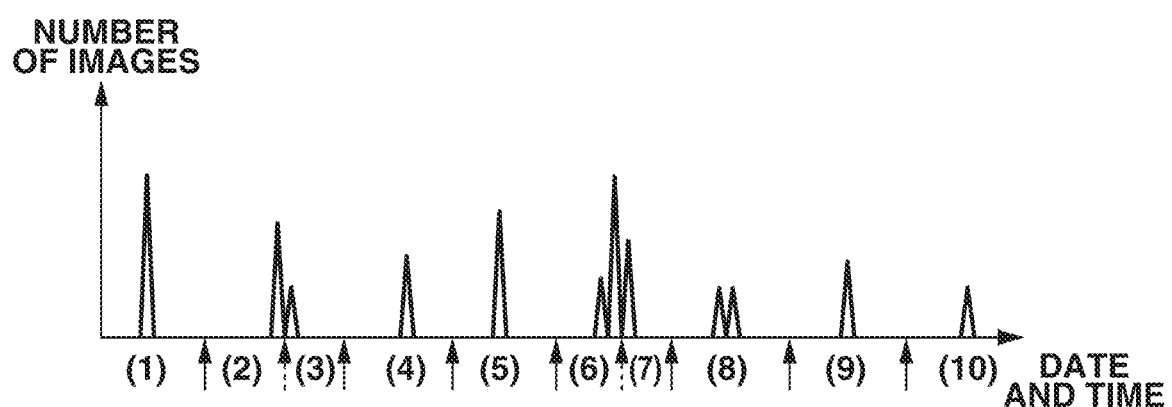
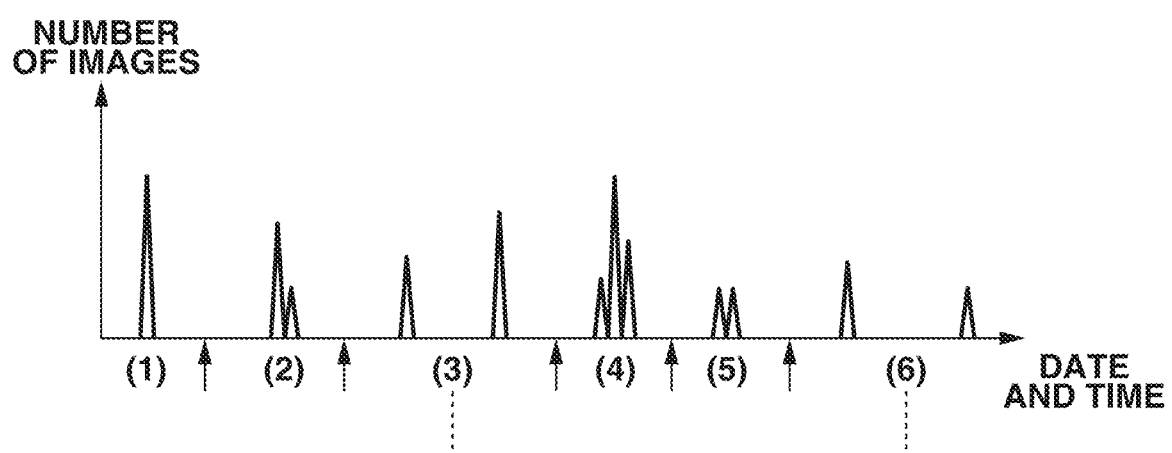

FIG.9

| SCENE | IMAGE CAPTURING PERIOD (TIME) | | NUMBER OF CAPTURED IMAGES (PIECES) | | NUMBER OF CAPTURED PERSONS (PERSONS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.10A

| SCENE | IMAGE FEATURE OF MAIN SLOT | IMAGE FEATURE OF SUB SLOT |
|---|---|---|
| TRAVEL | ZOOM OUT IMAGE INCLUDING PEOPLE AND LANDSCAPE | CLOSE-UP AND PROFILE IMAGE |
| DAILY LIFE | CLOSE-UP AND PROFILE IMAGE | ZOOM OUT IMAGE INCLUDING PEOPLE AND LANDSCAPE |
| CEREMONY | IMAGE OF TWO PEOPLE STANDING CLOSE TOGETHER | IMAGE OF MANY PEOPLE |

FIG.10B

| IMAGE ID | SCORE (OUT OF 50) | |
|---|---|---|
| | MAIN SLOT (SCORE) | SUB SLOT (SCORE) |
| 1 | 20 | 40 |
| 2 | 45 | 10 |
| 3 | 10 | 20 |
| ... | ... | ... |

FIG.12B1
1602  1601  1603
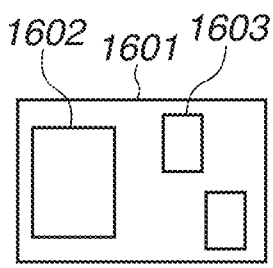
FIG.12C1
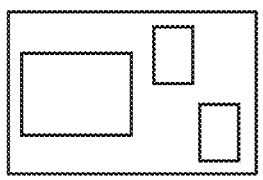
FIG.12D1
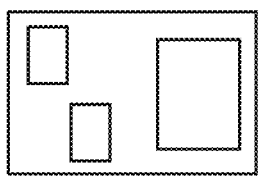
FIG.12E1
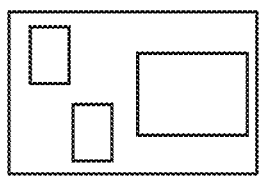
FIG.12B2
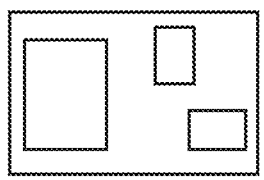
FIG.12C2
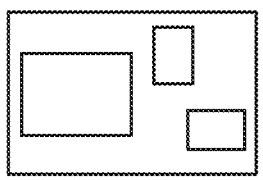
FIG.12D2
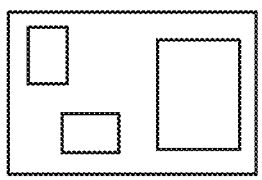
FIG.12E2
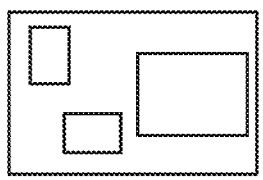
FIG.12B3
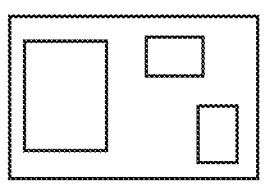
FIG.12C3
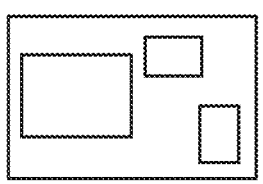
FIG.12D3
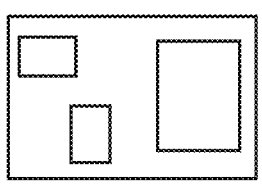
FIG.12E3
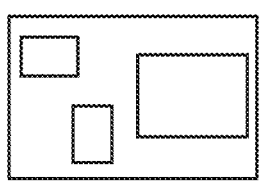
FIG.12B4
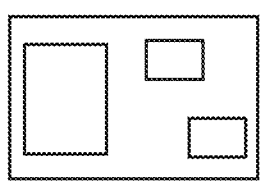
FIG.12C4
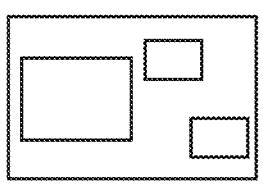
FIG.12D4
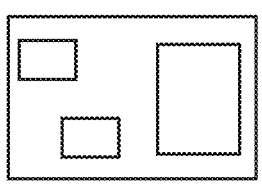
FIG.12E4
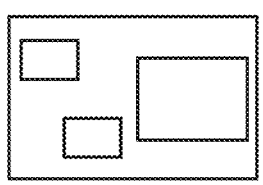
FIG.12A
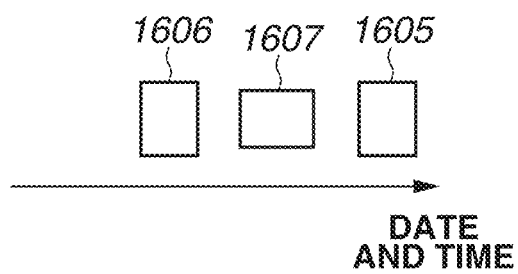
DATE AND TIME

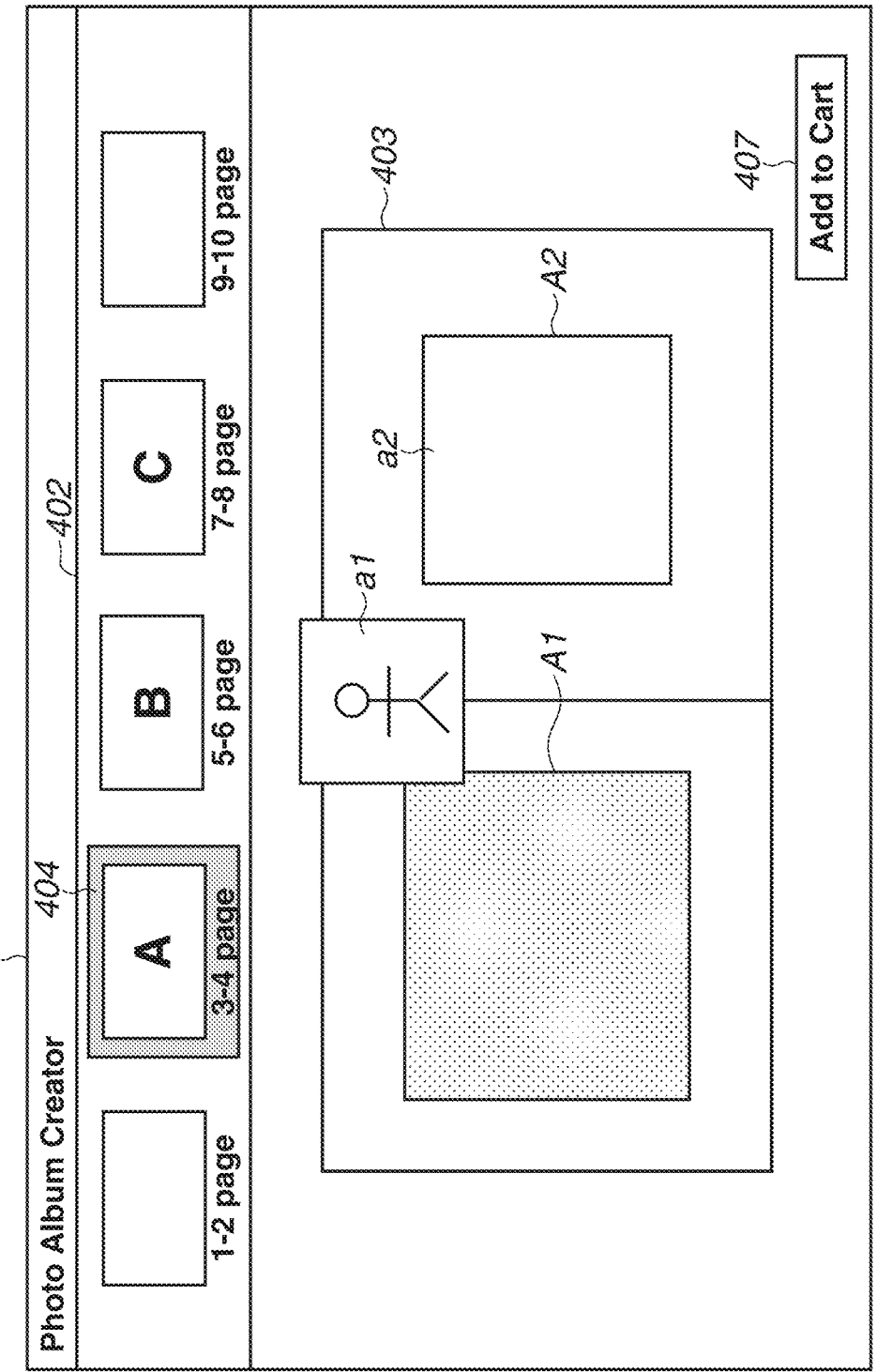

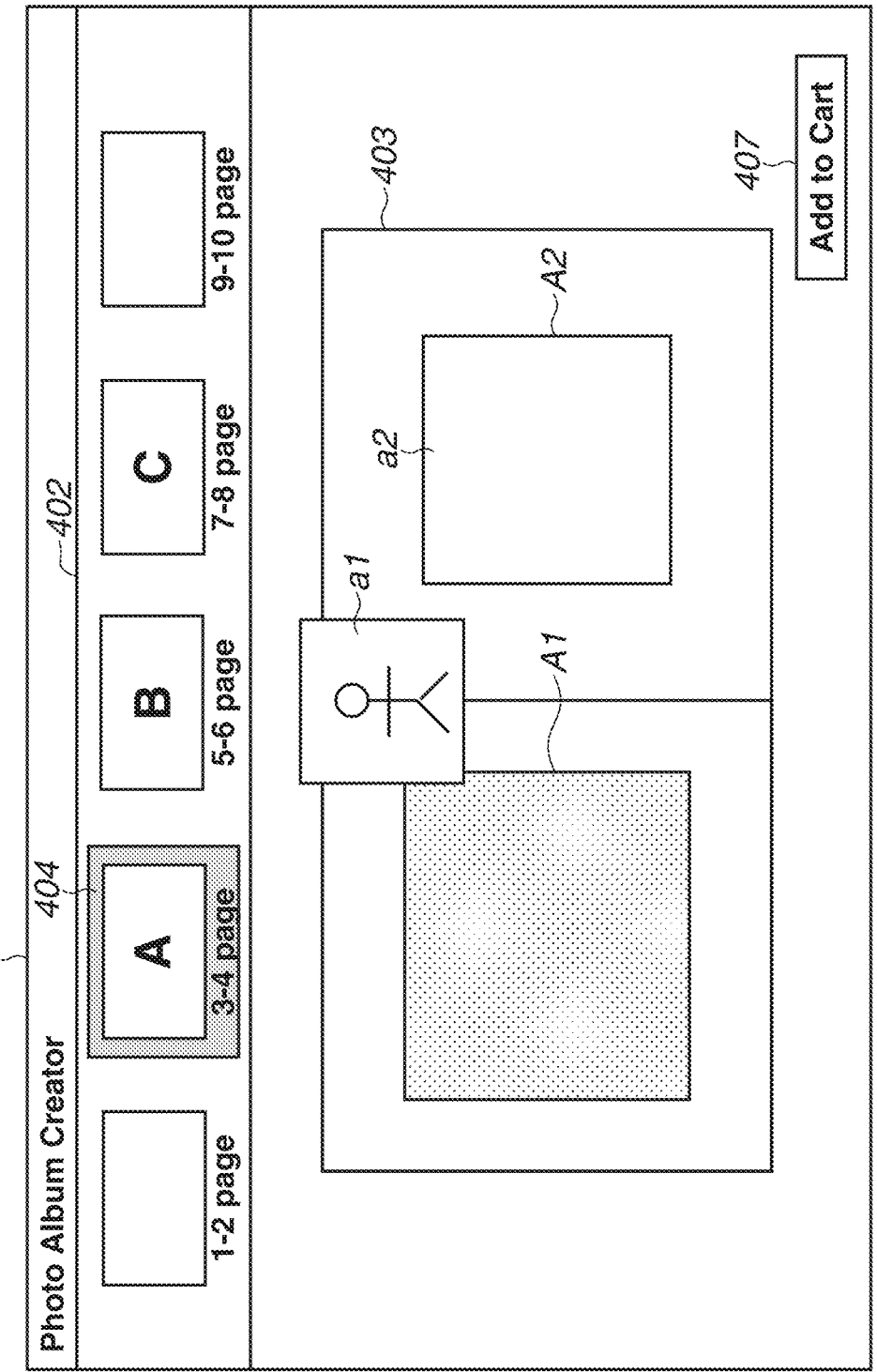

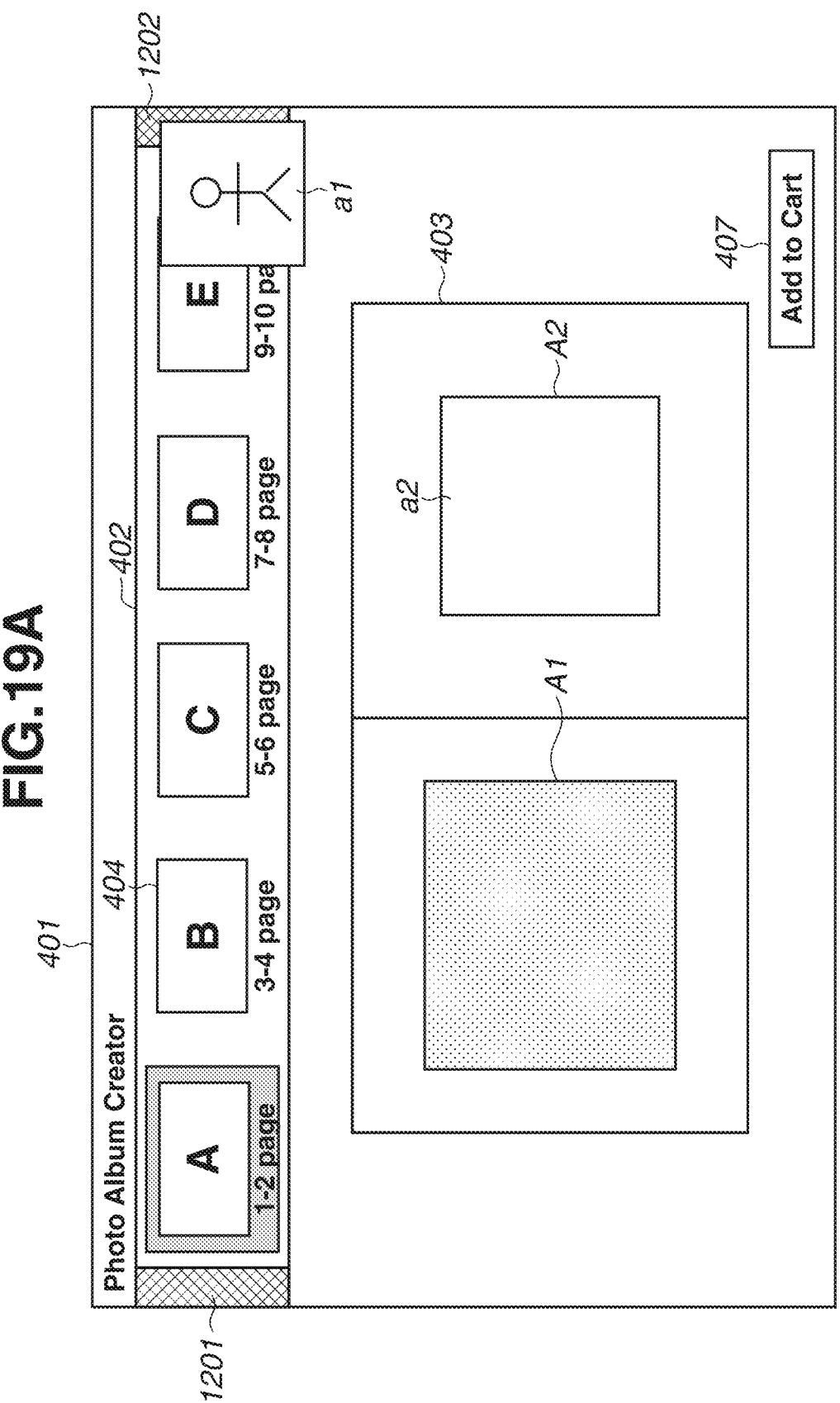

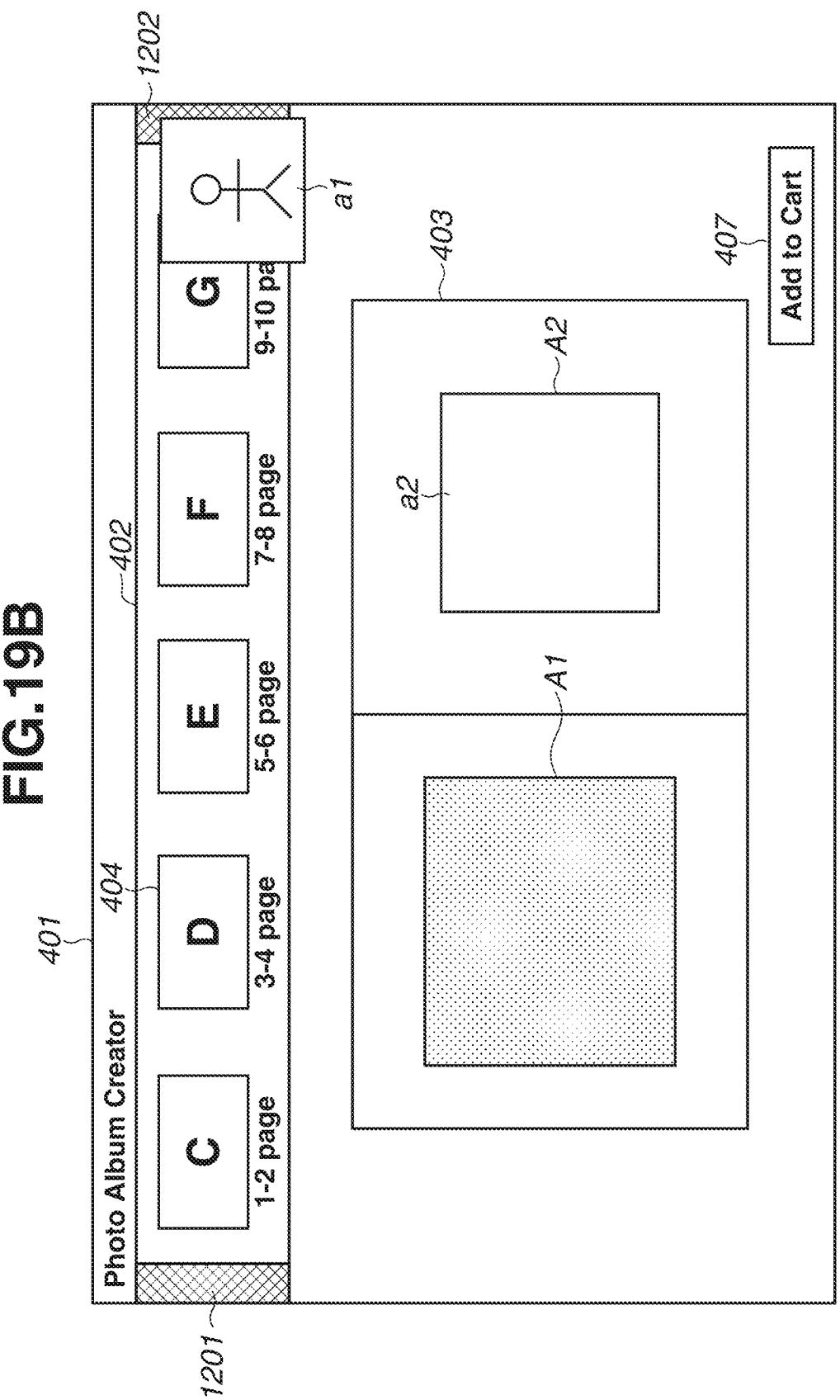

INFORMATION PROCESSING APPARATUS AND DISPLAY CONTROLLING METHOD FOR DISPLAYING AN ITEM IN A DISPLAY AREA IN RESPONSE TO MOVEMENT

BACKGROUND

Field

The present disclosure relates to an information processing apparatus, a display controlling method, and a program. Especially, the present disclosure relates to a technique for controlling display of an item.

Description of the Related Art

In touch panel operations of smartphones and tablet terminals, there is a method for moving an item such, as an application icon, to a different page by dragging and dropping. In this method, a user first drags the item, moves it to a right or left edge of a screen, and thus turns pages in order. When a desired page is displayed, the user moves the item away from the right or left edge of a screen and drops the item on the page, so that the item is rearranged on the desired page (see Japanese Patent Application Laid-Open No. 2016-115337).

According to Japanese Patent Application Laid-Open No. 2016-115337, when an item can be arranged in a plurality of pages and rearranged on an arbitrary page by a drag operation, it is necessary to keep dragging the item at a predetermined position (e.g., a right or left edge of a screen) to turn pages in order. In this method, pages are turned in order, and thus it takes a time when there are many pages.

SUMMARY

An information processing apparatus includes a display control unit configured to display a thumbnail list of a plurality of pages in a first display area of a display unit and display a page corresponding to a thumbnail selected in the thumbnail list displayed in the first display area in a second display area of the display unit, and a movement control unit configured to move an item in response to a drag operation by a user, wherein the movement control unit moves an item in a first page displayed in the second display area to a thumbnail corresponding to a second page which is different from the first page in the thumbnail list displayed in the first display area in response to a drag operation by a user, and accordingly the display control unit displays the second page in the second display area.

Further features of the present disclosure will become apparent from the following description of exemplary embodiments with reference to the attached drawings.

BRIEF DESCRIPTION OF THE DRAWINGS

FIG. 7 illustrates image analysis information in the automatic layout processing.

FIGS. 8A to 8C illustrate division of image groups in the automatic layout processing.

FIG. 9 is a table expressing scene classification in the automatic layout processing.

FIGS. 10A and 10B are tables expressing image scores in the automatic layout processing.

FIG. 12A, FIGS. 12B1 to 12B4, FIGS. 12C1 to 12C4, FIGS. 12D1 to 12D4, and FIGS. 12E1 to 12E4 illustrate image layouts in the automatic layout processing.

FIGS. 13A to 13D are schematic diagrams illustrating a display controlling method.

FIGS. 16A to 16D are schematic diagrams illustrating the display controlling method.

FIGS. 19A and 19B are schematic diagrams illustrating the display controlling method.

DESCRIPTION OF THE EMBODIMENTS

Various exemplary embodiments of the present disclosure will now be described in detail below with reference to the attached drawings. It is noted that the following exemplary embodiments are not meant to limit the scope of the present disclosure as encompassed by the appended claims. Further, not all combinations of features described in the exemplary embodiments are essential for solving means of the present disclosure.

Figure 1:
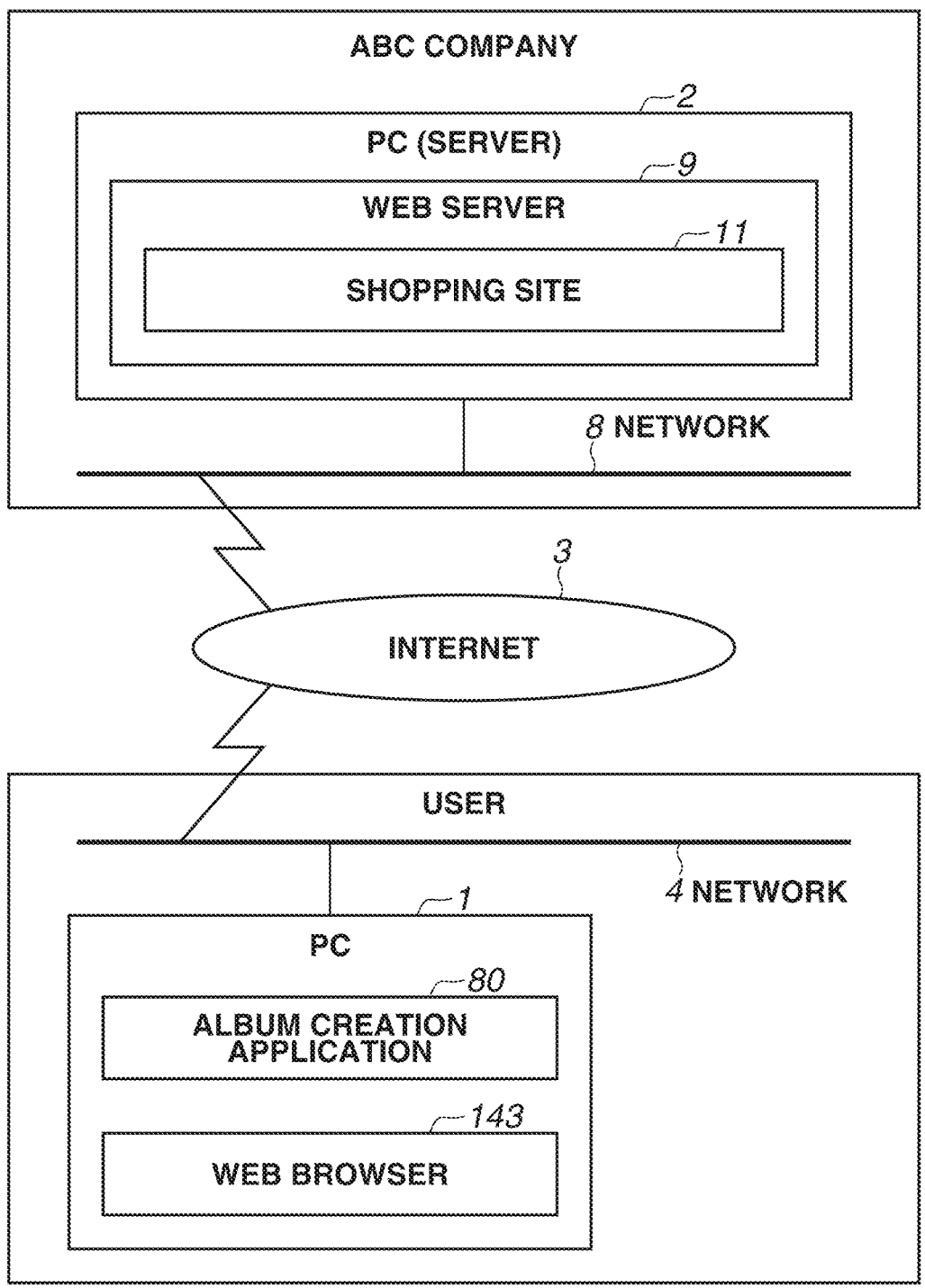
FIG. 1 illustrates a configuration of a system including an information processing apparatus.

FIG. 1 illustrates an example of a configuration of an information processing system for creating and ordering a photo album. As illustrated in FIG. 1, the information processing system includes an information processing apparatus 1 used by a user and an information processing apparatus 2 of a company which creates a photo album, and the information processing apparatus 1 and the information processing apparatus 2 are connected to each other via Internet 3. The information processing apparatus is, for example, a personal computer (PC). The information processing apparatus 2 is, for example, a server PC. The information processing apparatus 1 and the information processing apparatus 2 are each installed with an operating system (hereinbelow, also referred to as the OS) which is, for example, equivalent to Windows (registered trademark) 8 or Windows (registered trademark) Server 2012. The information processing apparatus 1 and the information processing apparatus 2 are respectively connected to networks 4 and 8 constituted of Ethernet (registered trademark).

The information processing apparatus 1 is installed with an application 80 (hereinbelow, also referred to as the album application) for creating a photo album. The application is constituted of, for example, an executable format file (*.exe) for Windows (registered trademark). The information processing apparatus 1 is also installed with a web browser application 143 (hereinbelow, also referred to as the web browser). The web browser 143 is used when the World Wide Web (WWW) is used. The network is a network for a user who uses the information processing apparatus 1 and may include, for example, a general household use home network.

The information processing apparatus 2 includes a web server 9 having a web server function and provides, for example, a web site of a predetermined company (assuming an ABC company) via the Internet 3. A shopping site 11 is provided by the ABC company for providing a service for a user, and a user can order a photo album using the shopping site 11.

Figure 2:
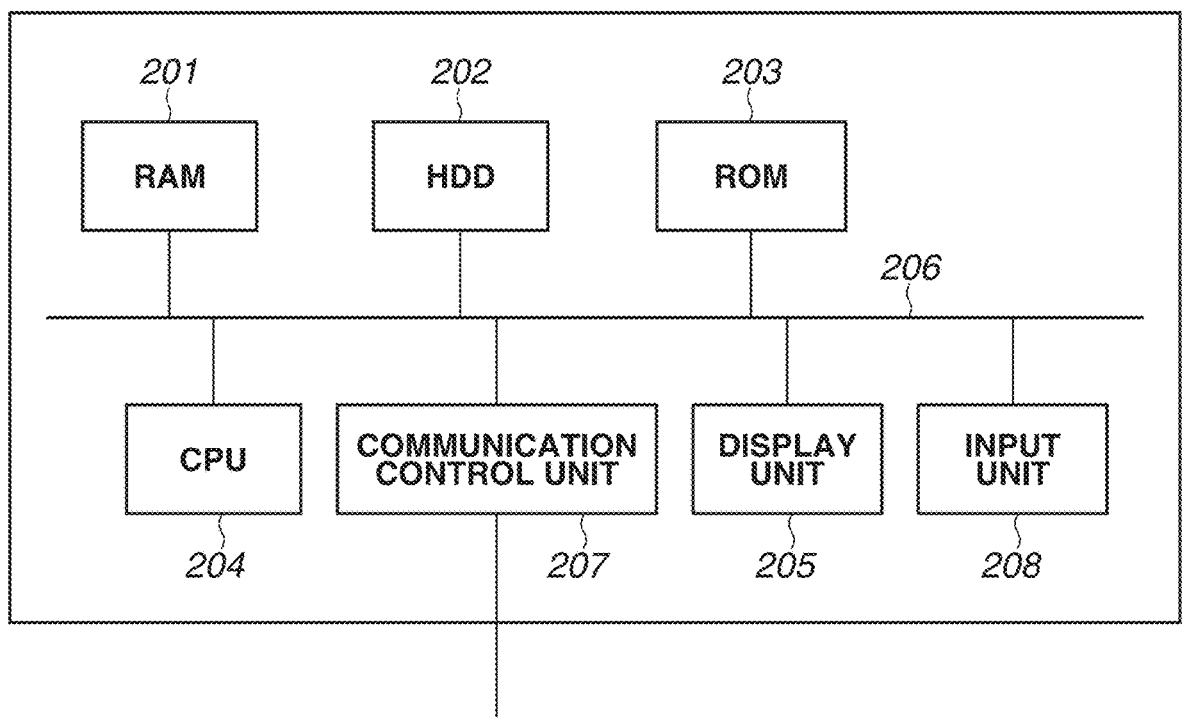
FIG. 2 illustrates a hardware configuration of the information processing apparatus.

FIG. 2 illustrates an example of a hardware configuration of the information processing apparatus 1. The information processing apparatus 2 also includes a similar configuration. However, the information processing apparatus 1 and the information processing apparatus 2 do not have to have the identical configuration. As illustrated in FIG. 2, the information processing apparatus 1 includes a central processing unit (CPU) 204, a random access memory (RAM) 201, a read-only memory (ROM) 203, a hard disk (HDD) 202, a display unit 205, an input unit 208, and a communication control unit 207, and each unit is connected to each other by a system bus 206.

The CPU 204 is a system control unit and controls the entire information processing apparatus 1. In addition, the CPU 204 executes a display controlling method described in the present exemplary embodiment according to a program.

The RAM 201 provides a memory for temporarily storing various information pieces when the CPU 204 executes a program. The ROM 203 stores a program to be executed by the CPU 204.

Figure 3:
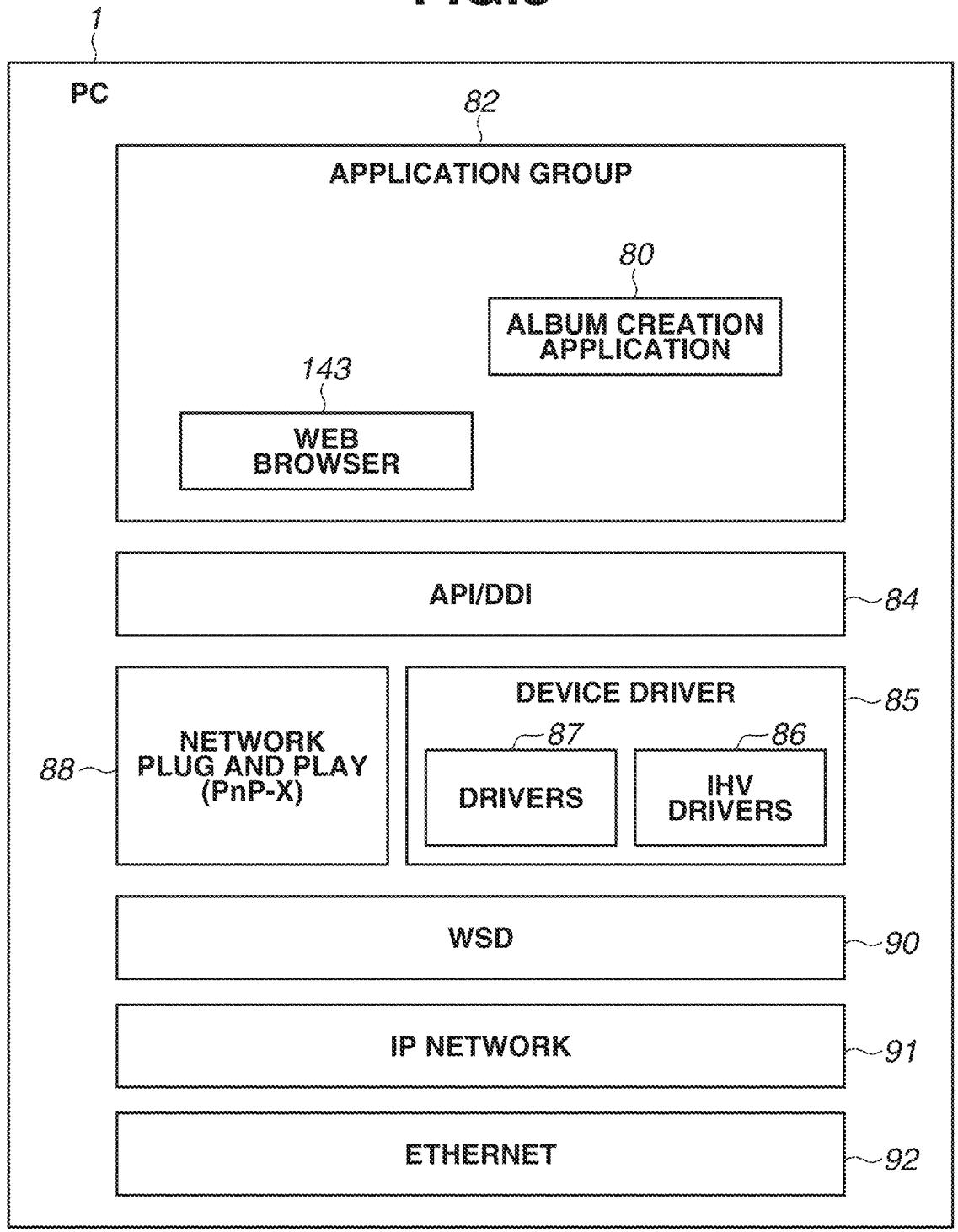
FIG. 3 illustrates a software configuration of the information processing apparatus.

The HDD 202 is a storage medium for storing a database and the like for storing an image file and processing results of image analysis and others. The HDD 202 which stores applications such as the album application and the web browser 143 and each module (software) described with reference to FIG. 3 is read by the RAM 201 and executed by the CPU 204 as necessary. Accordingly, the CPU 204 realizes functions of applications such as the application 80 and the web browser 143 and each module (software) described with reference to FIG. 3.

The display unit 205 displays to a user a user interface (UI) and a layout result of an image according to the present exemplary embodiment. The display unit 205 may have a touch sensor function. The input unit 208 is used by a user for performing various operations, for example, for inputting predetermined information to a UI displayed on the display unit 205.

The communication control unit 207 is a device for communicating with an external device such as a printer and a server. For example, album data generated using automatic layout is transmitted to the information processing apparatus 2 via the communication control unit 207.

FIG. 3 illustrates a configuration of a software module group stored in the HDD 202 of the information processing apparatus 1. Software modules illustrated in FIG. 3 are not whole but a part of the software module group stored in the HDD 202. In addition, the software module group stored in the HDD 202 is appropriately changed according to the OS installed in the information processing apparatus 1, a use environment of the information processing apparatus 1, and the like.

A module 92 is an Ethernet control stack for controlling the Ethernet. A module 91 is an Internet protocol (IP) Network control stack for controlling the IP Network. A module 90 is a Web Services on Devices (WSD) control stack for controlling the WSD which provides a mechanism for searching a device on the network. A module 88 is a plug and play extension (PnP-X) control stack for controlling plug and play of the network. The PnP-X stands for plug and play extensions which is a function standardly installed in Windows8 (registered trademark) as a series of extensions of plug and play for providing support to a network connecting device. A module 85 is a device driver group and includes a standard driver group 87 which is standardly included in the OS and an Independent Hardware Vendor (IHV)-made driver group 86 which is provided by an independent hardware vendor.

A module 84 is an application/device driver interface which includes an Application Programming Interface (API) and a Device Driver Interface (DDI). An application group 82 includes the application 80 and the web browser 143.

Figure 4:
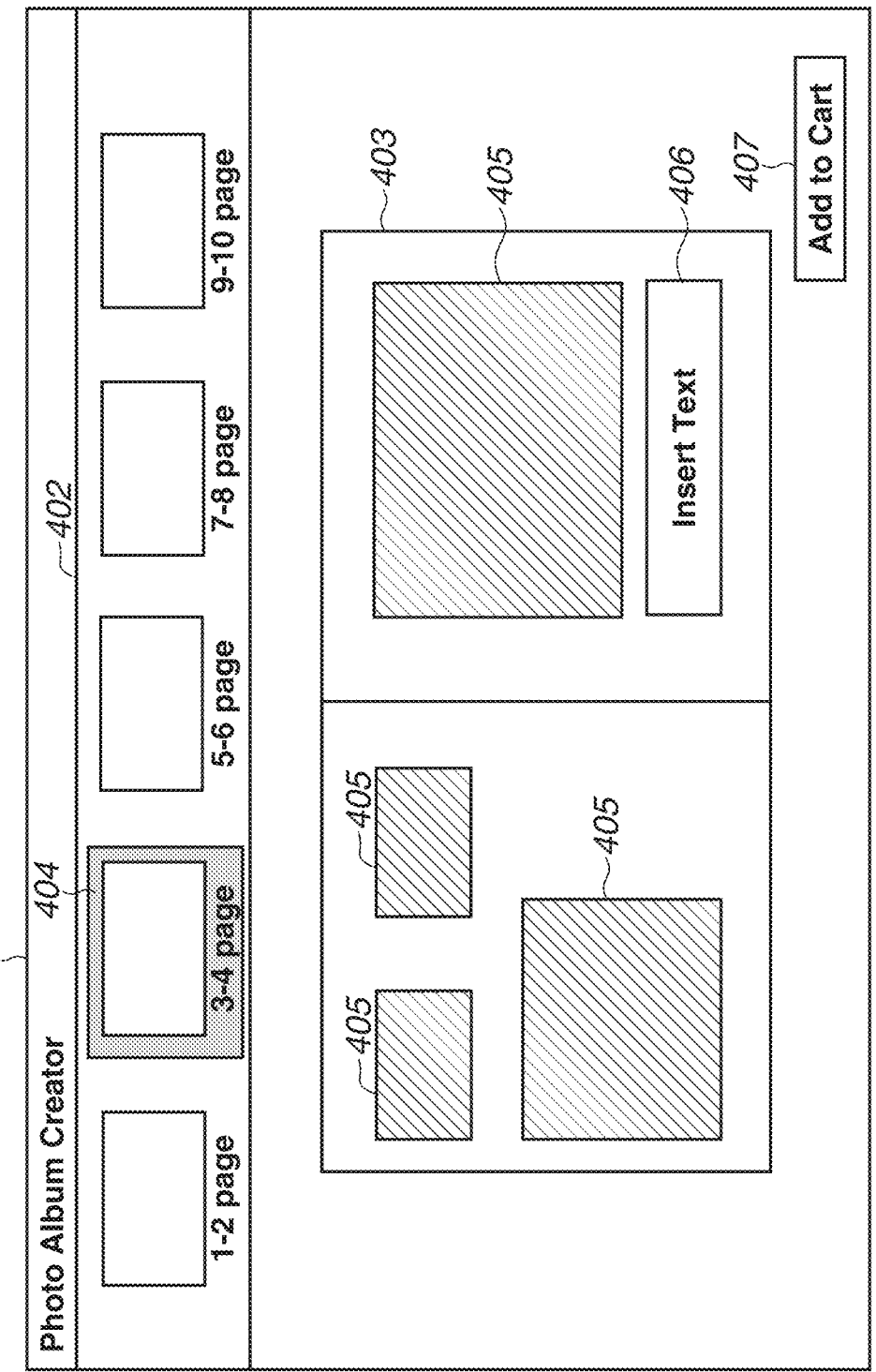
FIG. 4 is a schematic diagram of a screen provided by an album creation application.

FIG. 4 illustrates an example of a display screen and an editing screen for editing a photo album which is provided by the CPU 204 executing a photo album application. An editing screen 401 is provided by the photo album application. A display area 402 is an area for displaying thumbnails of respective pages in the photo album in a list. A display area 403 is an area for displaying a content (a preview image) of a page selected in the display area 402, and a layout image can be edited in the display area 403.

In the display area 402, when a user selects a desired thumbnail from among the thumbnails of the respective pages, the selected page becomes a selected state display 404. In FIG. 4, two pages, namely 3 to 4 pages (one spread) are in the selected state, and a layout image of these pages is displayed in the display area 403. A spread corresponds to, for example, one display window in display and a pair of pages adjacent to each other in printing.

In the display area 403, an editing operation can be performed on a photo album. A template displayed in the layout image includes one or more slots. In FIG. 4, a third page (a left page in the drawing) includes three slots 405, and a fourth page (a right page in the drawing) includes a slot 405. A picture is assigned to each slot 405. According to the present exemplary embodiment, a picture is automatically assigned to each of the slots 405. In a text box 406, an arbitrary text is input by a user.

A button 407 is a button for adding the photo album created (edited) by the application to a cart. When a user presses the button 407, the edited photo album is uploaded to a shopping cart of the information processing apparatus 2 via the Internet 3.

(Configuration of Automatic Layout Processing Unit)

Figure 5:
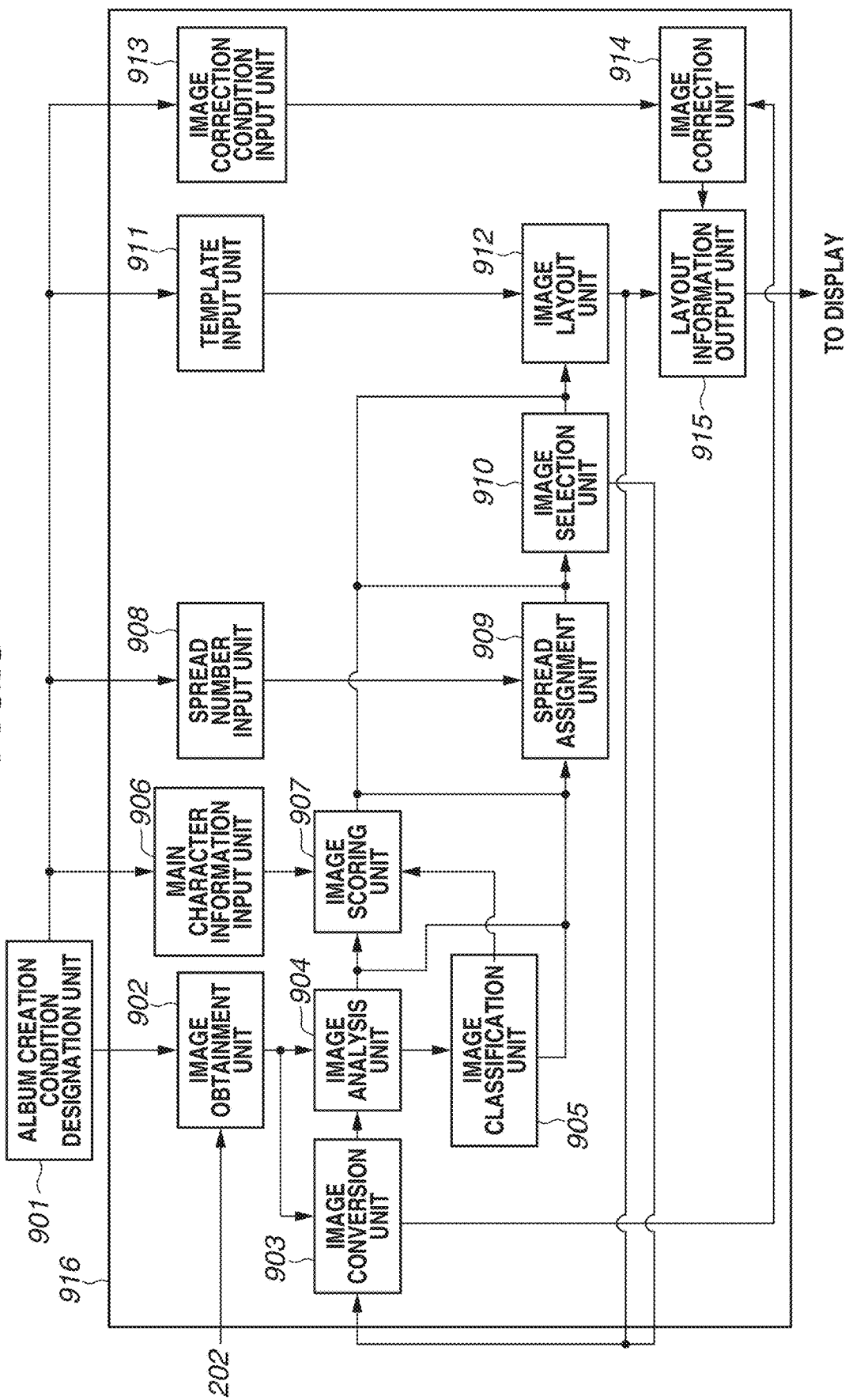
FIG. 5 illustrates an automatic layout-processing unit of the album creation application.

FIG. 5 is a software block diagram of a part of functions in an album creation application. The album creation application has various functions, and according to the present exemplary embodiment, an automatic layout function provided by an automatic layout processing unit 916 is especially described. The automatic layout function is a function of classifying or selecting captured pictures in terms of contents and attributes and laying out pictures to create an album image to be displayed in the display unit 205.

According to the present exemplary embodiment, the album creation application is started when a user presses an application icon displayed in the display unit 205. As illustrated in FIG. 5, the album creation application includes an album creation condition designation unit 901 and the automatic layout processing unit 916. An album creation condition is specified to the automatic layout processing unit 916 in response to a UI operation via the input unit 208 such as a mouse.

An image obtainment unit 902 obtains an image group designated by the album creation condition designation unit 901 from the HDD 202. The image group described here represents a group of candidate images to be laid out when an album is created. For example, when a period from January 1st, year *** to December 31st, year  is designated in the album creation condition designation unit 901, all images captured from January 1st, year  fall under a ** to December 31st, year designated image group.

An image conversion unit 903 converts image data used in subsequent processing into a desired pixel numbers and color information. According to the present exemplary embodiment, image data is converted into an analysis image having the pixel number of a short side pixels and standard red, green, and blue (sRGB) color information.

An image analysis unit 904 performs processing of feature amount obtainment, face detection, facial expression recognition, and individual recognition, which are described below, from the analysis image. In addition, the image analysis unit 904 obtains an image capturing date and time from data, for example, exchangeable image file format (Exif) information, associated with the image obtained from the HDD 202.

An image classification unit 905 performs processing of scene division and scene classification, which are described below, on the image group using the image capturing date and time information, the number of pictures, and information of the detected face. A scene represents a scene captured in a travel, daily life, a wedding ceremony, and the like. A scene may also represent, for example, a group of images of a photographing target captured in a certain period of photographing opportunity.

A main character information input unit 906 inputs a main character identification information (ID) instructed from the album creation condition designation unit 901 to an image scoring unit 907.

The image scoring unit 907 scores each image. According to the present exemplary embodiment, the image scoring unit 907 performs scoring to give a high score to an image suitable for layout. When performing scoring to give a high score to an image suitable for layout, the image scoring unit 907 uses information pieces obtained by the image analysis unit 904 and the image classification unit 905. The image scoring unit 907 scores each image to give a high score to an image including the main character ID input from the main character information input unit 906.

A spread assignment unit 909 divides the image group and assigns an image to each spread. A spread described here represents, for example, a spread when an album is created and corresponds to two pages.

A spread number input unit 908 inputs the number of spreads of an album designated by the album creation condition designation unit 901 to the spread assignment unit 909.

The spread assignment unit 909 divides the image group in response to the input number of spreads and assigns a part of the image group to each spread. For example, when the number of spreads is five, the spread assignment unit 909 divides the obtained image group into five small image groups and assign one image group to each spread.

An image selection unit 910 selects an image from the part of the image group assigned to each spread by the spread assignment unit 909 based on the score given by the image scoring unit 907.

A template input unit 911 inputs a plurality of templates corresponding to template information designated by the album creation condition designation unit 901 to an image layout unit 912.

The image layout unit 912 determines a layout of an image. More specifically, the template input unit 911 selects a template suitable for the image selected by the image selection unit 910 from the input templates and determines a layout (arrangement position) of each image.

An image correction condition input unit 913 inputs an ON/OFF condition of image correction designated by the album creation condition designation unit 901 to an image correction unit 914.

The image correction unit 914 performs dodging correction, red-eye correction, and contrast correction. When the image correction condition is ON, the image correction unit 914 performs correction on the image. When the image correction condition is OFF, correction is not performed. The image correction unit 914 performs ON/OFF of correction on the image input from the image conversion unit 903. The number of pixels of the image input from the image conversion unit 903 to the image correction unit 914 can be changed according to a size of the layout determined by the image layout unit 912.

A layout information output unit 915 outputs layout information for displaying on a display according to the image layout determined by the image layout unit 912. The layout information is, for example, bitmap data obtained by laying out the selected image in the selected template.

(Flow of Automatic Layout Processing)

Figure 6:
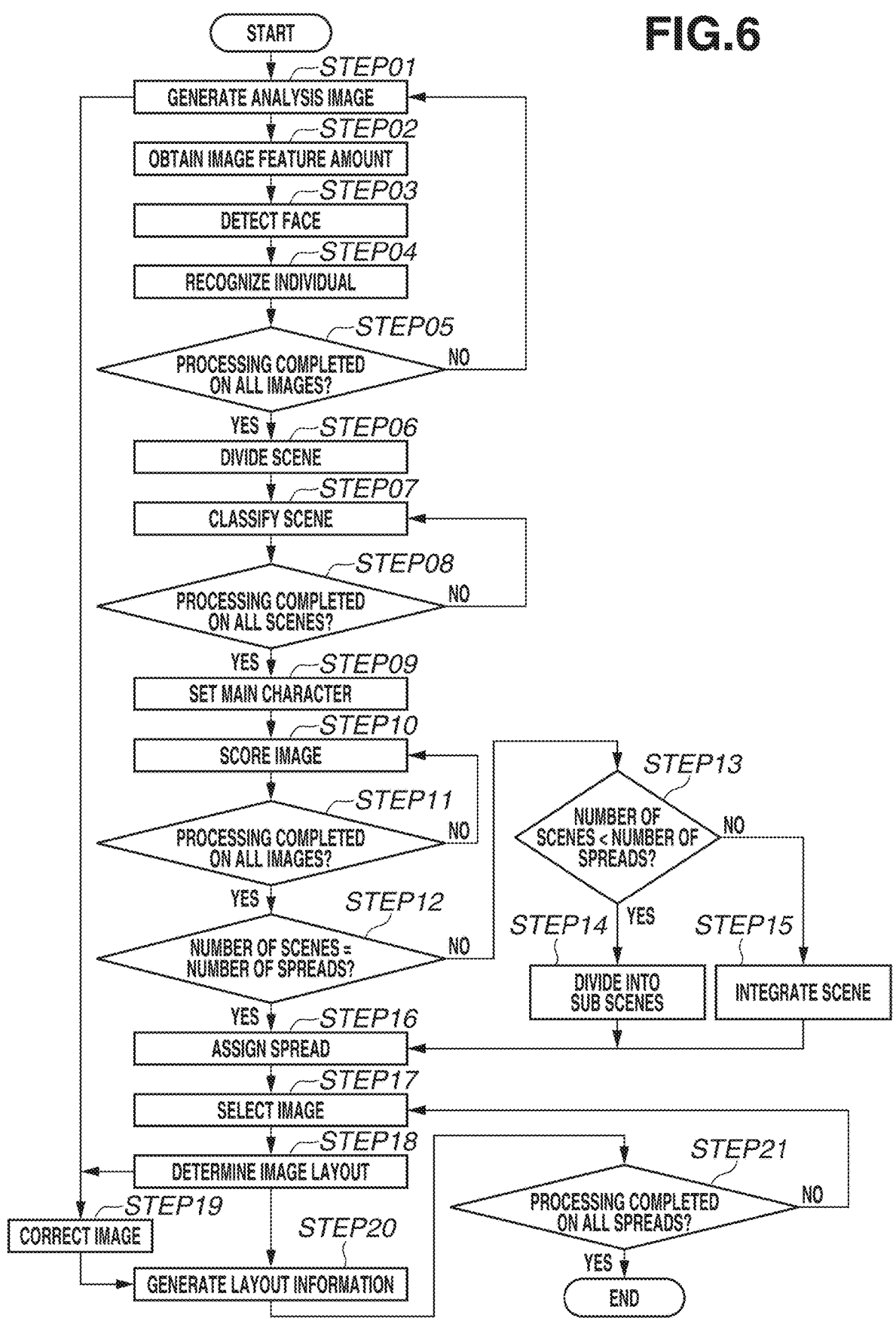
FIG. 6 is a flowchart illustrating a flow of automatic layout processing.

FIG. 6 is a flowchart illustrating a processing flow regarding the automatic layout processing unit 916 of the album creation application according to the present exemplary embodiment. The processing in the flowchart illustrated in FIG. 6 is realized by, for example, the CPU 204 reading a program stored in the HDD 202 to the ROM 203 and the RAM 201 and executing the program. The flow of the automatic layout processing is described with reference to FIG. 6.

In Step01, the image conversion unit 903 generates an analysis image. The image conversion unit 903 converts each image in the image group in the HDD 202 designated by the album creation condition designation unit 901 into a desired number of pixels and color information. The number of pixels and the color information converted in Step01 are determined in advance and stored. According to the present exemplary embodiment, an image is converted into an analysis image having the pixel number of a short side pixels and sRGB color information.

In Step02, the image analysis unit 904 obtains an image feature amount. The image analysis unit 904 obtains the image capturing date and time from, for example, Exif information associated with each image data obtained from the HDD 202. Further, the image analysis unit 904 obtains a feature amount from the analysis image generated in Step01. The feature amount includes, for example, a focus. A sobel filter is generally known as an edge detection method. An edge is detected by the sobel filter, and an edge gradient can be calculated by dividing a brightness difference between a start point and an end point of the edge by a distance between the start point and the end point. An average gradient of edges in the image is calculated, and it can be understood that an image having a large average gradient is in focus than an image having a small average gradient. A focus amount can be calculated by setting a plurality of different threshold values with respect to gradients and determining which threshold value that the gradient is greater than or equal to. According to the present exemplary embodiment, different two threshold values are set, and a focus amount is determined on a three-point scale, namely ○, Δ, and *. The threshold values are set through experiments in such a manner that a focus gradient intended to be applied to an album is indicated by ○, an allowable focus gradient is indicated by Δ, and an unallowable focus gradient is indicated by *.

In Step03, the image analysis unit 904 performs face detection. The image analysis unit 904 detects a face from the analysis image generated in Step01. Known methods can be used for face detection and, for example, adaptive boosting (AdaBoost) can be used which generates a strong classifier from a plurality of prepared weak classifiers. According to the present exemplary embodiment, a face of a person (object) is detected by a strong classifier generated by AdaBoost. The image analysis unit 904 detects a face image and also obtains an upper left coordinate value and a lower right coordinate value of a position of the detected face. The "image" described here represents an image expressed by the image data generated in Step01. These two types of coordinates are specified, and thus a position and a size of a face of a person can be specified. A person's face is detected here, however, without limiting to a person's face, an object, such as animals like a dog and a cat, a flower, a food, a building, and a figure may be used as a detection target instead of a person's face, and a strong classifier can be generated by AdaBoost. In other words, an object other than a face may be detected.

In Step04, the image analysis unit 904 recognizes an individual. The image analysis unit 904 first compares the face image extracted in Step03 with a representative face image stored in a face dictionary database for each individual ID in terms of similarity. An ID of which similarity is greater than or equal to a threshold value and the highest is regarded as an ID of the extracted face image. When similarity is less than the threshold value, the extracted face image is registered in the face dictionary database as a new face with a new individual ID.

Image analysis information pieces obtained in Step02 to Step04 are distinguished and stored for each ID for identifying each image as shown in FIG. 7. The image capturing date and time information and the focus determination result obtained in Step02 and the number and the position information of faces detected in Step03 are stored. The position information of the face is distinguished and stored for each individual ID obtained in Step04. When a face is not detected in the image data, the image capturing date and time information and the focus determination result obtained in Step02 are stored.

In Step05, it is determined whether the processing in Step01 to Step04 is completed on all images in the image group in the HDD 202 designated by the album creation condition designation unit 901. When the processing is not completed (NO in Step05), the processing returns to Step01. When the processing is completed (YES in Step05), the processing shifts to Step06.

In Step06, the image classification unit 905 performs scene division. The scene division is to divide the obtained image group into a plurality of sub image groups according to a scene. More specifically, the image classification unit 905 divides the image group into a plurality of sub image groups by relying on a time difference between images based on the image capturing date and time information obtained in Step02. In a case where image capturing dates of images are not consecutive, in other words, a day on which an image was not captured exists between image capturing dates, the image group is divided. Next, a case is described in which the image capturing dates are consecutive. According to the present exemplary embodiment, the image group is divided when a difference in the image capturing times of images is 16 hours or longer. In a case where a difference in the image capturing times of images is less than 16 hours, the image group is divided when a time difference from a first photographing to a last photographing is less than 4 hours in each of consecutive days. According to the present exemplary embodiment, in a case where the time difference from the first photographing to the last photographing is 4 hours or longer, the image group is divided when the number of images captured in each of consecutive days is less than 50, and the image group is not divided when the number of images is 50 or more. The threshold value of the time difference and the threshold value of the number of images are not limited to the above-described ones. FIG. 8A illustrates a result when the image group is divided by the above-described scene division method.

In Step07, the image classification unit 905 performs scene classification. According to the present exemplary embodiment, a case in which each sub image group (each scene) is classified into three categories, namely, a travel, a daily life, and a ceremony is described as an example, however, the categories are not limited to these three. First, the image classification unit 905 obtains a plurality of sub image groups of which categories to be classified into are preliminarily determined from any of the travel, the daily life, and the ceremony. The image classification unit 905 obtains a photographing feature amount of each image group. Feature amounts to be obtained in the present exemplary embodiment are, for example, an image capturing period, the number of captured images, and the number of captured persons. The image capturing period is a time difference from the first photographing to the last photographing in the image group. The number of captured images is the number of images (the number of photographs) included in the sub image group. The number of captured persons is the number of faces in an image in which faces are captured. In other words, the number of faces included in an image. The image classification unit 905 calculates an average value and a standard deviation of the image capturing periods, an average value and a standard deviation of the number of captured images, and an average value and a standard deviation of the number of persons per image with respect to the plurality of sub image groups. According to the present exemplary embodiment, the number of faces per image is regarded as the number of persons per image. FIG. 9 indicates respective average values and standard deviations of the image capturing period (time), the number of captured images (pieces), and the number of captured persons (persons). These calculated values are incorporated in a program of the album creation application in advance. After the album creation application is started, the image classification unit 905 calculates respective average values of the image capturing period, the number of captured images, and the number of captured persons with respect to each divided sub image group obtained by the scene division in Step06 of the image group designated in a pass box (not illustrated) by a user. Further, the image classification unit 905 scores feature amounts of the image capturing period, the number of captured images, and the number of captured persons of each of the sub image groups for each scene using following equations based on the respective average values and standard deviations.

Score=50−|10*(average value−feature amount)/standard deviation| (equation 1)

Average score=(score of image capturing period+score of the number of captured images+score of the number of persons)/the number of feature amount items (equation 2)

Accordingly, an average score is calculated for each of the travel, the daily life, and the ceremony. A scene having the highest score in each sub image group is classified as the scene of the relevant sub image group. When two or more scenes have the same score, they are classified as priority scenes. For example, according to the present exemplary embodiment, the categories are prioritized in order of daily life>ceremony>travel, and the daily life has the highest priority.

Regarding a sub image group (5) subjected to the scene division in FIG. 8A, the image capturing period is 36 hours, the number of captured images is 300 pieces, and the number of captured persons is 1.7 persons. An average score of the travel is 45.32, an average score of the daily life is 18.38, and an average score of the ceremony is −29.92, so that the scene is classified into the travel. The classified scene is managed by the scene ID so as to be identifiable.

In Step08, it is determined whether the scene classification in Step07 is completed on all sub image groups divided in Step06. When the processing is not completed (NO in Step08), the processing returns to Step07. When the processing is completed (YES in Step08), the processing shifts to Step09.

In Step09, the image scoring unit 907 sets a main character. The main character setting is performed on the image group designated by a user in two ways, namely automatic and manual. When the main character is set automatically, the setting is performed based on the result of the individual recognition in Step04 and the result of the scene division in Step06. The image scoring unit 907 specifies the number of times of each individual ID appearing in the sub image groups, the number of times of each individual ID appearing in each scene, and the number of times of scenes in which each individual ID appears therein from the result obtained in Step04 and automatically sets the main character from these information pieces. According to the present exemplary embodiment, when the sub image group includes a plurality of scenes, an individual ID appearing in the plurality of scenes is set to the main character ID, and when the sub image group includes a single scene, an individual ID having the larger number of times of appearance in the single scene is set to the main character ID. When a user designates a specific icon, an individual ID corresponding to the selected icon is transmitted to the image scoring unit 907 via the main character information input unit 906. When there is an individual ID designated by a user, the main character ID automatically set as described above is ignored, and the user designated individual ID is set to the main character ID. As described above, the setting based on the designation by the main character information input unit 906 is referred to as the manual setting.

In Step10, the image scoring unit 907 performs scoring. The scoring is a value to be referred to when an image is selected, which is described below, and each image data is scored by being evaluated in below-described terms.

FIG. 12A, FIGS. 12B1 to 12B4, FIGS. 12C1 to 12C4, FIGS. 12D1 to 12D4, and FIGS. 12E1 to 12E4 illustrate a template group used when three images are laid out. A template 1601 illustrated in FIG. 12B1 is a single template which includes a main slot 1602 and sub slots 1603 and 1604. The main slot 1602 is a main slot (a frame in which an image is laid out) in the template 1601 which is larger in size than the sub slots 1603 and 1604. The sub slot is a slot other than a main slot in each template. Each image data is given both of a score for a main slot and a score for a sub slot. In scoring processing, each image is given both of a score for a main slot and a score for a sub slot.

Next, FIG. 10A indicates references for scoring image data. FIG. 10A is a table indicating a feature of an image to be given a higher score in each scene of a travel, a daily life, and a ceremony for the main slot and the sub slot. As shown in FIG. 10A, a feature given a high score is different according to a type of the slot. For example, when the scene classification of the sub image group is the travel, a zoom-out image including person and landscape is given a high score as the main slot, and an image of close-up of a face and profile is given a high score as the sub slot. For example, when the scene classification of the sub image group is the daily life, an image of close-up of a face and profile is given a high score as the main slot, and a zoom-out image including person and landscape is given a high score as the sub slot. For example, when the scene classification of the sub image group is the ceremony, an image of two persons standing close to each other is given a high score as the main slot, and an image including many people is given a high score as the sub slot. As described above, a feature given a high score, in other words, an evaluation criterion is different depending on a type of scene and slot. According to the present exemplary embodiment, a feature given a high score depending on a type of scene and slot is set in advance in the application and included in the program. The feature given a high score is not limited to the above-described ones. The image scoring unit 907 scores each image data included in each sub image group based on the respective features of the main slot and the sub slot of each scene indicated in FIG. 10A. The image scoring unit 907 obtains the number of faces in each image, positions of the faces in each image, and sizes of the faces in each image, calculates an average value and a standard deviation for each scene and each slot type (the main slot and the sub slot), and stores these values in the program of the album creation application. The image scoring unit 907 specifies which scene an image indicated by each image data in the image group designated by a user belongs to (is classified into) from the result of the scene classification in Step07. Further, the image scoring unit 907 calculates a score and an average score using following equations based on the preliminarily calculated average value and standard deviation corresponding to the scene of the target image and each feature amount of the number of faces, positions of the faces, and sizes of the faces of the main character ID in the target image.

Score=50−|10*(average value−feature amount)/standard deviation|

Average score=(score of the number of faces+score of face position+score of face size)/the number of feature amount items Scoring is performed for both of the main slot and the sub slot. In addition, regarding an image used for the album, an image having an image ID of which a feature amount of focus in FIG. 7 is "o" may be given an additional score. Accordingly, a high score can be given to an image in focus. FIG. 10B is an example of a scoring result of each image, and scores of the main slot and the sub slot are given to each image ID.

In Step11, the image scoring unit 907 determines whether scoring of images in Step10 is completed on all images in the image group designated by the user. When the processing is not completed (NO in Step11), the processing returns to Step10. When the processing is completed (YES in Step11), the processing shifts to Step12.

In Step12, the spread assignment unit 909 determines whether the number of scenes (the number of the sub image groups) obtained by the scene division by the image classification unit 905 is the same as the number of spreads input by the spread number input unit 908. When the number is not the same (NO in Step12), the processing shifts to Step13. When the number is the same (YES in Step12), the processing shifts to Step16. For example, when the number of scene divisions in FIG. 8A is eight, and the input number of the spread number input unit 908 is eight, the processing shifts to Step16.

In Step13, the spread assignment unit 909 determines whether the number of scenes obtained by the scene division by the image classification unit 905 is less than the number of spreads input by the spread number input unit 908. When the number of scenes is not less than the number of spreads (NO in Step13), the processing shifts to Step15. When the number of scenes is less than the number of spreads (YES in Step13), the processing shifts to Step14. For example, when the number of scene divisions in FIG. 8A is eight, and the input number of the spread number input unit 908 is ten, the number of scenes is less than the number of spreads, and the processing shifts to Step14.

In Step14, the spread assignment unit 909 performs sub-scene division. The sub-scene division represents to further subdivide the divided scene when the number of scene divisions<the number of spreads. A case is described as an example in which the specified number of spreads is ten with respect to eight of the number of scene divisions in FIG. 8A. FIG. 8B illustrates a result when the sub-scene division is performed on FIG. 8A. The sub image groups are further divided at positions of dashed line arrows, and thus the number of divisions becomes ten. The reference for the sub-scene division is the number of images and the image capturing date and time. In the divisions in FIG. 8A, the spread assignment unit 909 specifies the sub image group including a large number of images. In this case, the spread assignment unit 909 intends to increase the number of scenes from eight to ten by adding two scenes and thus specifies two sub image groups including the large number of images. In descending order, there are the sub image group (5), and the sub image group (1) and the sub image group (2).

According to the present exemplary embodiment, when the sub image groups including the same number of images, the sub image group of which a time difference between the first image and the last image included in the sub image group is larger is divided. The sub image group (1) and the sub image group (2) include the same number of images, however, a time difference between the first image and the last image is larger in the sub image group (2), so that the sub image group (2) becomes a division target. In other words, the sub image group (5) and the sub image group (2) are each further divided in FIG. 8B.

First, a division method of the sub image group (2) is described. The sub image group (2) includes two peaks of the number of images, and these two peaks have different image capturing dates. In this case, the sub image group is divided at a point at which the image capturing date changes (a point indicated by a dashed line arrow in FIG. 8B).

Next, division of the sub image group (5) is described. The sub image group (5) includes three peaks of the number of images, and these three peaks have different image capturing dates. In this case, the sub image group is also divided at a point at which the image capturing date changes. In this regard, there are two points at which the image capturing date changes, and division is performed so as to reduce a difference in number of images between the image groups after the division. In FIG. 8B, when the sub image group (5) is divided at a boundary between the second day and the third day, a difference between the number of images in each image group after the division becomes smaller than when being divided at a boundary between the first day and the second day, so that the sub image group (5) is divided at the boundary between the second day and the third day. In other words, the sub image group (5) is divided at a point of a dashed line arrow in FIG. 8B. Accordingly, the number of divisions is increased from eight to ten. In this example, the sub image group is divided at the point at which the image capturing date is different, however, when the sub image group includes a large number of images which were captured in a single day, the sub image group is divided at a point at which a time difference is the largest in the single day.

In Step15, the spread assignment unit 909 performs scene integration. The scene integration is to integrate the divided scenes (the sub image groups) when the number of scenes is more than the number of spreads. More specifically, the scene integration is performed to match the number of scenes with the number of spreads. FIG. 8C illustrates a result when the scene integration is performed on FIG. 8A to reduce the number of scenes to six in a case where the number of spreads is six. The scenes are integrated at points indicated by dashed lines, in other words, the scenes are not divided at the points indicated by the dashed lines, so that the number of scenes (the number of sub image groups) becomes six. In the scene integration, the spread assignment unit 909 specifies the sub image groups including a small number of images. In this case, the spread assignment unit 909 intends to reduce the number of divisions from eight to six by reducing two scenes and thus specifies the sub image groups including the small number of images.

As the sub image group including the small number of images, there are the sub image group (8), the sub image group (3), and the sub image group (7) in ascending order. Thus, the sub image group (8) is first regarded as an integration target. Next, the sub image group (3) and the sub image group (7) include the same number of images. However, the sub image group (7) is adjacent to the sub image group (8) which is the integration target, so that the sub image group (3) is regarded as an integration target. Next, the spread assignment unit 909 determines whether to integrate the sub image group as the integration target into the sub image group having preceding image capturing date and time or the sub image group having later image capturing date and time. First, integration of the sub image group (3) is described. When comparing time differences of the sub image group (2) and the sub image group (4) before and after the sub image group (3), a difference of the image capturing times between the last image in the sub image group (3) and the first image in the sub image group (4) is smaller than a difference of the image capturing times between the first image in the sub image group (3) and the last image in the sub image group (2). Therefore, the spread assignment unit 909 determines to integrate the sub image group (3) into the sub image group (4). In other words, the sub image groups are integrated at a point indicated by a dashed line in FIG. 8C. Next, integration of the sub image group (8) is described. The sub image group (8) is integrated into the preceding sub image group (7) since there is no following sub image group. In other words, the sub image groups are integrated at a point indicated by a dashed line in FIG. 8C. According to the present exemplary embodiment, the sub image groups of which the difference of the image capturing times therebetween is small are integrated, however, the integration is not limited to this. For example, the sub image group as the integration target may be integrated into the sub image group including the small number of captured images.

In Step16, the spread assignment unit 909 assigns spreads. By the processing in Step12 to Step15, the number of the sub image groups matches with the specified number of spreads. According to the present exemplary embodiment, the spread assignment unit 909 assigns the sub image group having the first image capturing date and time from a first spread. In other words, the spread assignment unit 909 assigns the sub image group to each spread page of the album in the order of image capturing date and time. Accordingly, the album can be created in which the sub image groups are arranged in the order of image capturing date and time. As described below, it is not necessary to arrange images in the order of image capturing date and time within one spread page.

Figure 11A:
FIGS. 11A to 11I illustrate image selection in the automatic layout processing.
Figure 11B:
Figure 11C:
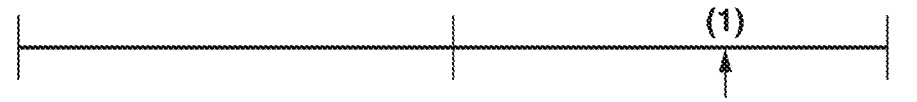
Figure 11D:
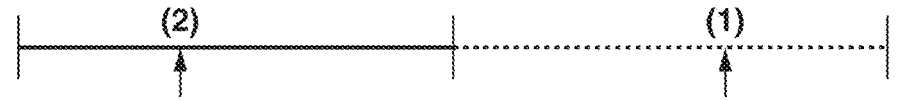
Figure 11E:
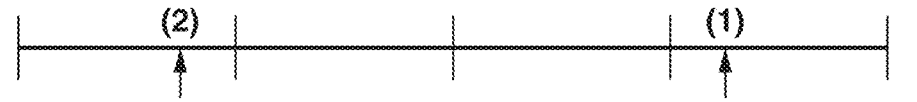
Figure 11F:
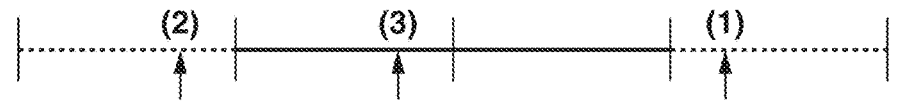
Figure 11G:
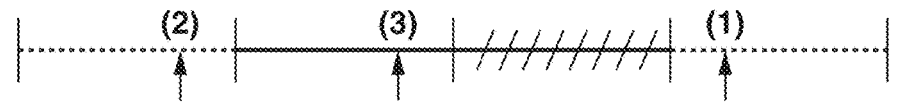
Figure 11H:
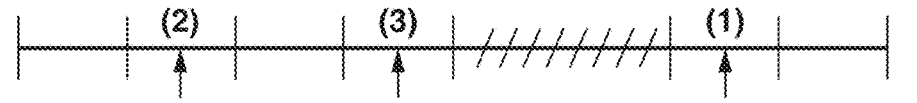
Figure 11I:
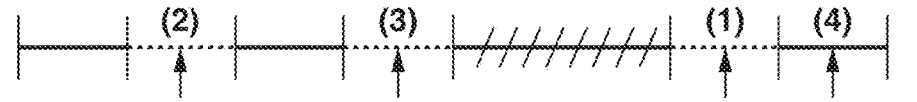

In Step17, the image selection unit 910 selects a predetermined number of images from each of the sub image groups. A case is described as an example in which four images are selected from the sub image group assigned to a spread with reference to FIGS. 11A to 11I. The spread represents two pages, and a first spread and a last spread each include one page. FIG. 11A illustrates a time difference of the image capturing date and times from the first image to the last image included in the sub image group assigned to the spread, in other words, the image capturing period of the sub image group. A method for selecting a first image when selecting four images is described with reference to FIG. 11B. A template includes a main slot 1602 (FIG. 12B1). The image selection unit 910 selects a first image for the main slot. The image selection unit 910 selects an image having the highest score in the score for the main slot assigned in Step10 from among all images captured in the image capturing period of the sub image group illustrated in FIG. 11B. Further, the image selection unit 910 selects second and subsequent images for the sub slots. According to the present exemplary embodiment, the image is selected by subdividing the image capturing period of the sub image group so that the images are not concentrated at a part of the image capturing period in the sub image group. First, the image selection unit 910 divides the image capturing period of the sub image group into two as illustrated in FIG. 11C to obtain two image capturing periods. In other words, the image selection unit 910 divides (groups) a sub divided image capturing period into two halves and obtain the two image capturing periods. Next, the image selection unit 910 selects an image having the highest score in the score for the sub slot as the second image from the image capturing period (an interval indicated by a solid line) from which the first image is not selected as illustrated in FIG. 11D. Next, as illustrated in FIG. 11E, the image selection unit 910 divides each image capturing period in FIG. 11D into two halves. The image selection unit 910 selects an image having the highest score in the score for the sub slot as the third image from among images (images corresponding to two image capturing periods) captured in a solid line interval in FIG. 11F, in other words, two image capturing periods from which the first and the second images are not selected. Next, a case in which no image exists in an image capturing period from which an image to be selected and thus the image selection unit 910 cannot select the image is described using selection of the fourth image as an example. According to the present exemplary embodiment, the image capturing period is divided according to a time length regardless of the number of images. Thus, there is a case that no image exists in the image capturing period obtained by division. For example, it is assumed that the image selection unit 910 intends to select the fourth image from an image capturing period (a shaded interval) from which an image is not selected yet, however, no image exists in the shaded interval as illustrated in FIG. 11G. In this case, as illustrated in FIG. 11H, the image selection unit 910 divides each image capturing period from which the image is already selected into two. Next, as illustrated in FIG. 11I, the image selection unit 910 selects an image having the highest score in the score for the sub slot as the fourth image from among images captured in solid line image capturing periods from which the first to the third images are not selected.

In Step18, the image layout unit 912 determines an image layout of a processing target spread. A case is described as an example in which the template input unit 911 inputs templates in FIGS. 12B1 to 12E4 to certain spreads according to the designated template information. The number of slots in the input templates is three. It is assumed that when selected three images are arranged in the order of image capturing date and time, orientations namely a vertical direction or a horizontal direction thereof are obtained as illustrated in FIG. 12A. In FIG. 12A, an image 1605 is an image selected for the main slot, and images 1606 and 1607 are images selected for the sub slots. According to the present exemplary embodiment, an image having older image capturing date and time is laid out on an upper left of the template, and an image having newer image capturing date and time is laid out on a lower right of the template. The image 1605 is an image for the main slot having the newest image capturing date and time, so that the templates in FIGS. 12D1 to 12D4 are candidates to be used. Further, the image 1606 which is an older image for the sub slot, in other words, an image to be arranged on the upper left is a vertical image, and the newer image 1607 is a horizontal image. Thus, the layout is determined by regarding that the template in FIG. 12D2 is most suitable for the selected images. As described above, in Step18, the template used for the layout and information which can identify which image is laid out in which slot in the template are determined. According to FIG. 12A, FIGS. 12B1 to 12B4, FIGS. 12C1 to 12C4, FIGS. 12D1 to 12D4, and FIGS. 12E1 to 12E4, the case in which the number of slots is thee is described as the example, however, when the necessary number of images becomes four in Step17, the image layout unit 912 prepares a set of templates including four slots and determines a matching degree of a slot status and an image status with respect to the templates in the similar manner. Accordingly, the image layout unit 912 may determine which image is laid out in which template.

In Step19, the image correction unit 914 performs image correction. When the image correction condition input unit 913 inputs ON, the image correction unit 914 performs the image correction. According to the present exemplary embodiment, the image correction unit 914 automatically performs dodging correction, red-eye correction, and contrast correction as the image correction. When the image correction condition input unit 913 inputs OFF, the image correction unit 914 does not perform the image correction. The number of pixels of an image to be corrected is 1200 pixels in a short side, and ON/OFF of the image correction is performed on an image converted into a sRGB color space.

In Step20, the layout information output unit 915 creates the layout information. The layout information output unit 915 lays out each image as determined in Step18. At that time, the layout information output unit 915 changes a magnification of the image to be laid out according to size information of each slot included in the template. Further, the layout information output unit 915 generates bitmap data by laying out the image in the template.

In Step21, it is determined whether the processing in Step17 to Step20 is completed on all spreads. When the processing is not completed (NO in Step21), the processing returns to Step17. When the processing is completed (YES in Step21), the automatic layout processing is completed.

(Editing of Photo Album)

Next, an operation for editing a laid out photo album is described. An example is described here in which a picture set in a slot on a certain page is exchanged to a picture set in a different page. According to the present exemplary embodiment, a picture (image) after laid out is regarded as a display item, and an example of display control when the item is moved based on a user operation is described.

FIGS. 13A to 13D illustrate states in which the editing screen 401 for the photo album is displayed in a display area of a terminal device (a PC, a smartphone, and a tablet terminal) as the information processing apparatus 1. A display area 402 is an area for displaying a thumbnail of each page of the photo album by a list. A display area 403 is an area for displaying a content (a preview image) of a page selected in the display area 402, and the album can be edited therein. When a user selects a desired thumbnail from among thumbnails corresponding the respective pages in the display area 402, the relevant page becomes the selected state display 404, and a layout image of the relevant page is displayed in the display area 403. In FIGS. 13A to 13D, one spread of the album corresponds to two pages, the thumbnail list in the display area 402 is separately displayed in unit of spread of the album, and the layout image is also displayed for each spread in the display area 403. The display control according to FIGS. 13A to 13D is realized by the CPU 204 reading a program stored in the HDD 202 to the ROM 203 and the RAM 201 and executing the program.

Figure 13A:
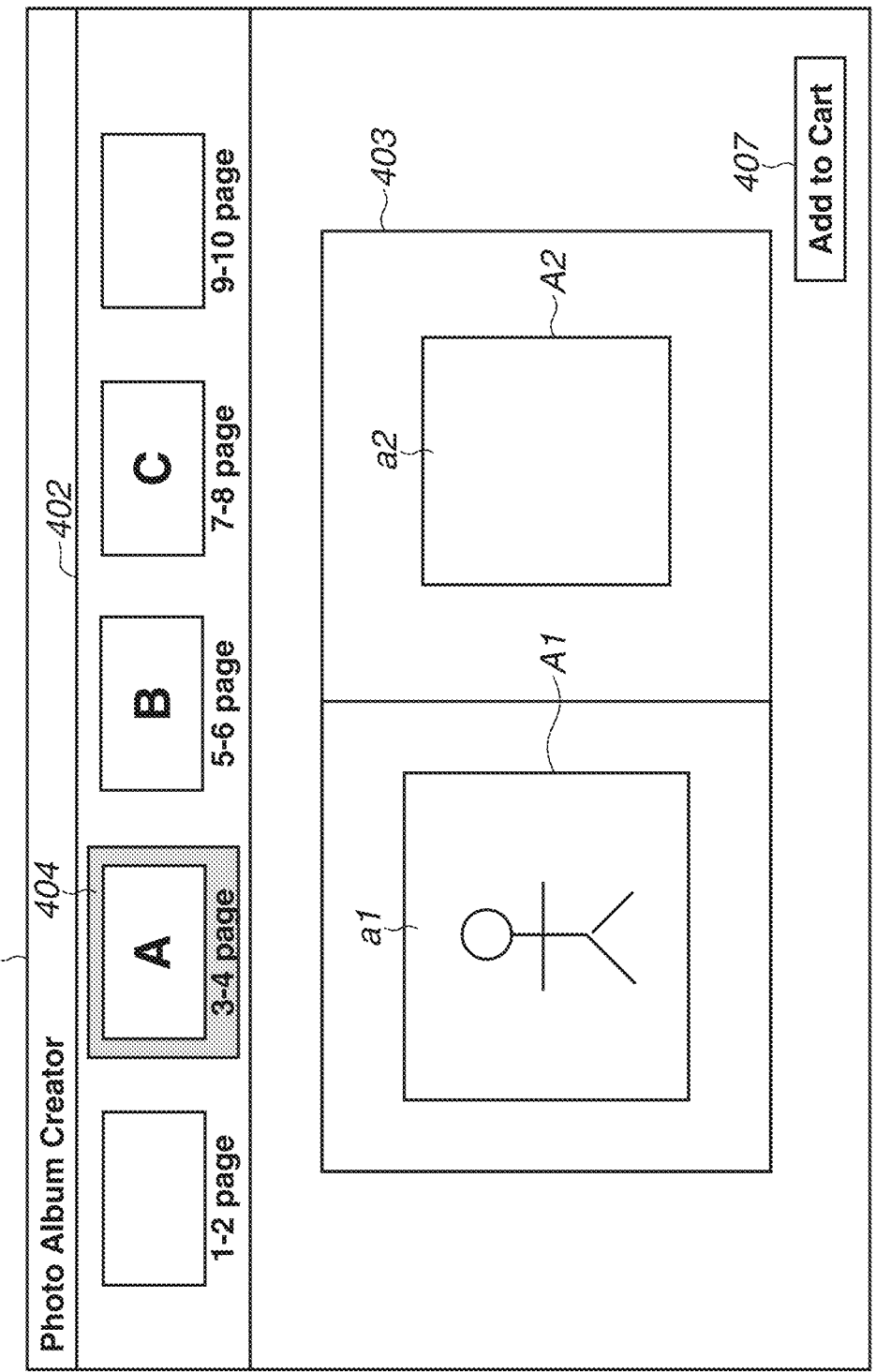

In FIG. 13A, a thumbnail of a spread A (two pages corresponding to the third and fourth pages) is selected in the thumbnail display area 402, so that a preview image of the spread A is displayed in the display area 403 for displaying a preview of the photo album. The spread A includes the slots A1 and A2, and pictures a1 and a2 are respectively arranged therein.

FIG. 13B illustrates a state in which the picture a1 in the slot A1 is dragged and held by a user operation. In the state in which the picture a1 is dragged and held, the picture a1 is in a state being withdrawn from the slot A1, and thus the inside of the slot A1 is displayed in gray which indicates that no image is arranged therein.

Figure 13C:
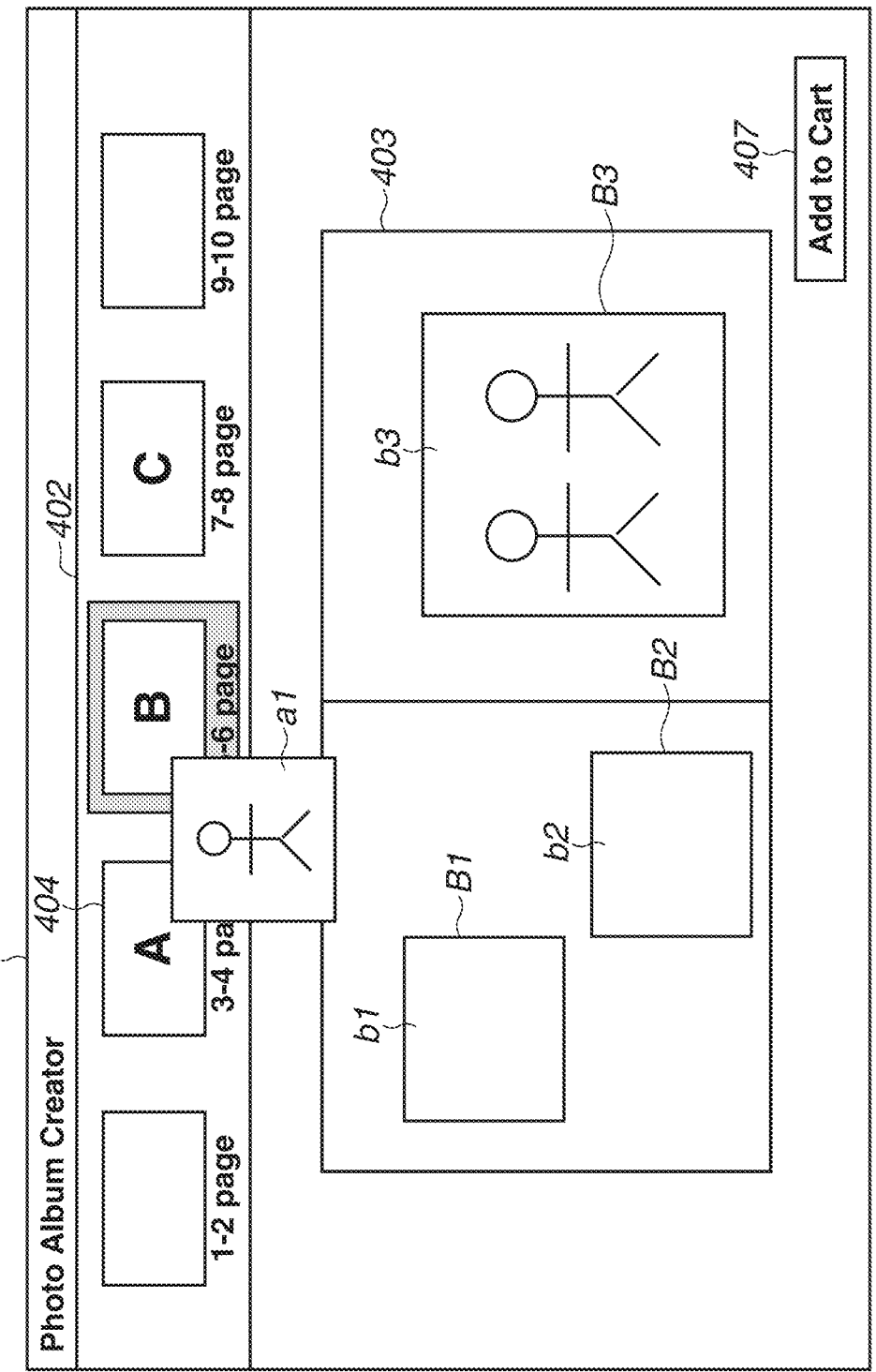

FIG. 13C illustrates a state in which the picture a1 held by the drag operation is moved to a thumbnail corresponding to a spread B in the display area 402 and overlapped on the thumbnail of the spread B. As described above, the picture held by the drag operation is moved and overlapped with the thumbnail corresponding to the spread B in the thumbnail display area 402, and accordingly the display in the display area 403 is switched to the spread B. The spread B includes slots B1, B2, and B3, and pictures b1, b2, and b3 are respectively arranged therein.

Figure 13D:
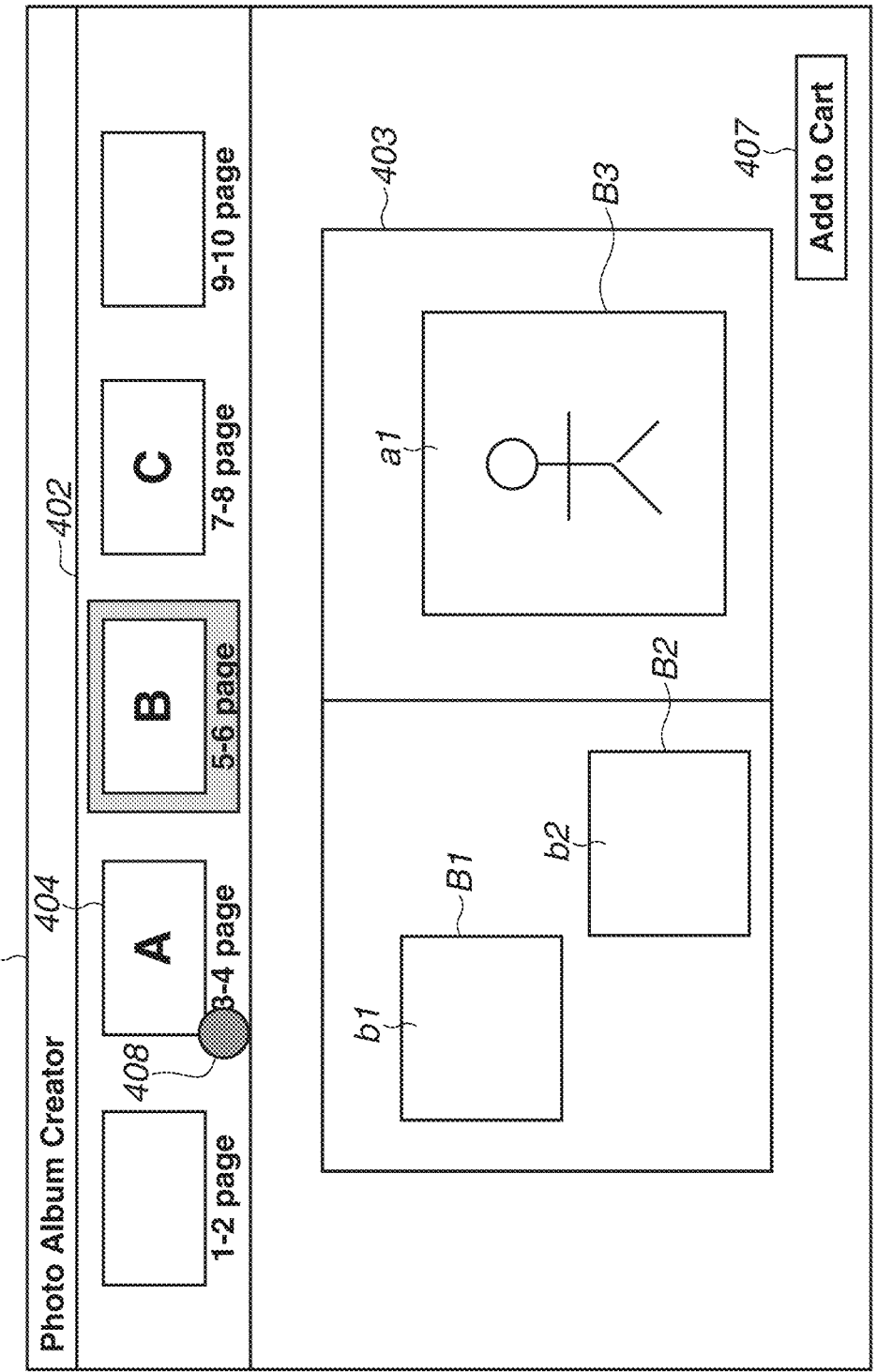

FIG. 13D illustrates a state in which the picture a1 being dragged and held is dropped (dragging is released) on the slot B3. In the present example, when a pointer dragging the picture a1 enters an area of the slot B3, the picture a1 is in a state to be able to be dropped and arranged in the slot B3.

When the user drops the picture a1 on the slot B3, the picture a1 is arranged in the slot B3. In the present example, a picture b3 originally arranged in the slot B3 is arranged in the slot A1 of the spread A. In other words, the picture a1 and the picture b3 exchange the arrangement areas.

By the above-described operations, the layouts of the spread A and the spread B are updated, and the thumbnail of the spread A and the thumbnail of the spread B in the thumbnail display area 402 are updated. In the present example, an unread mark 408 is displayed on the spread A after the image is exchanged. This is because the spread A is not yet displayed in the display area 403 even though the content of the spread A is updated, and the user has not confirmed the updated content of the spread A in the display area 403. An unread mark is thus attached to a page not yet confirmed by a user, and accordingly, the user can prevent from ordering the album including an unread page.

Figure 14A:
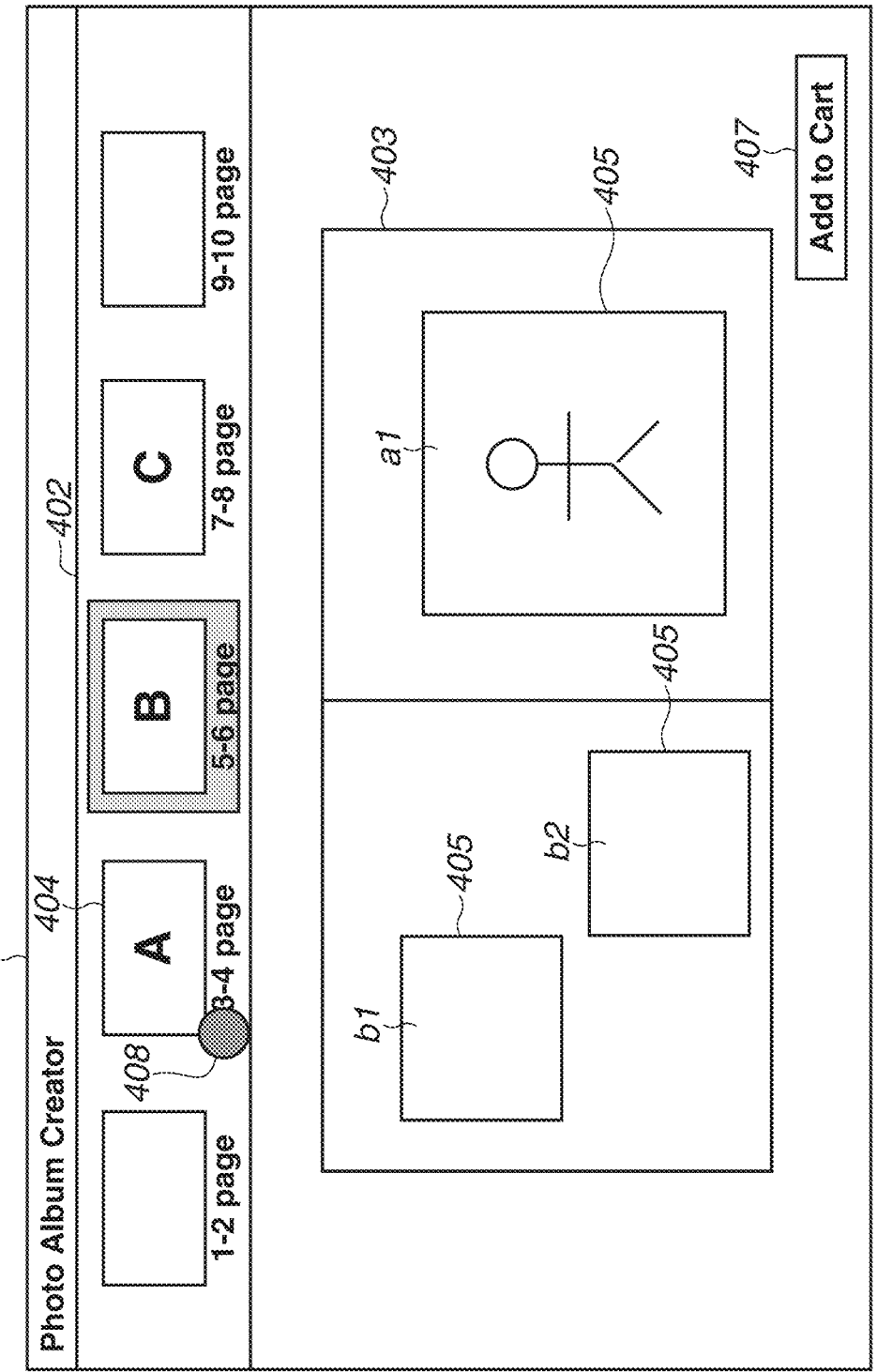
FIGS. 14A and 14B are schematic diagrams illustrating the display controlling method.
Figure 14B:
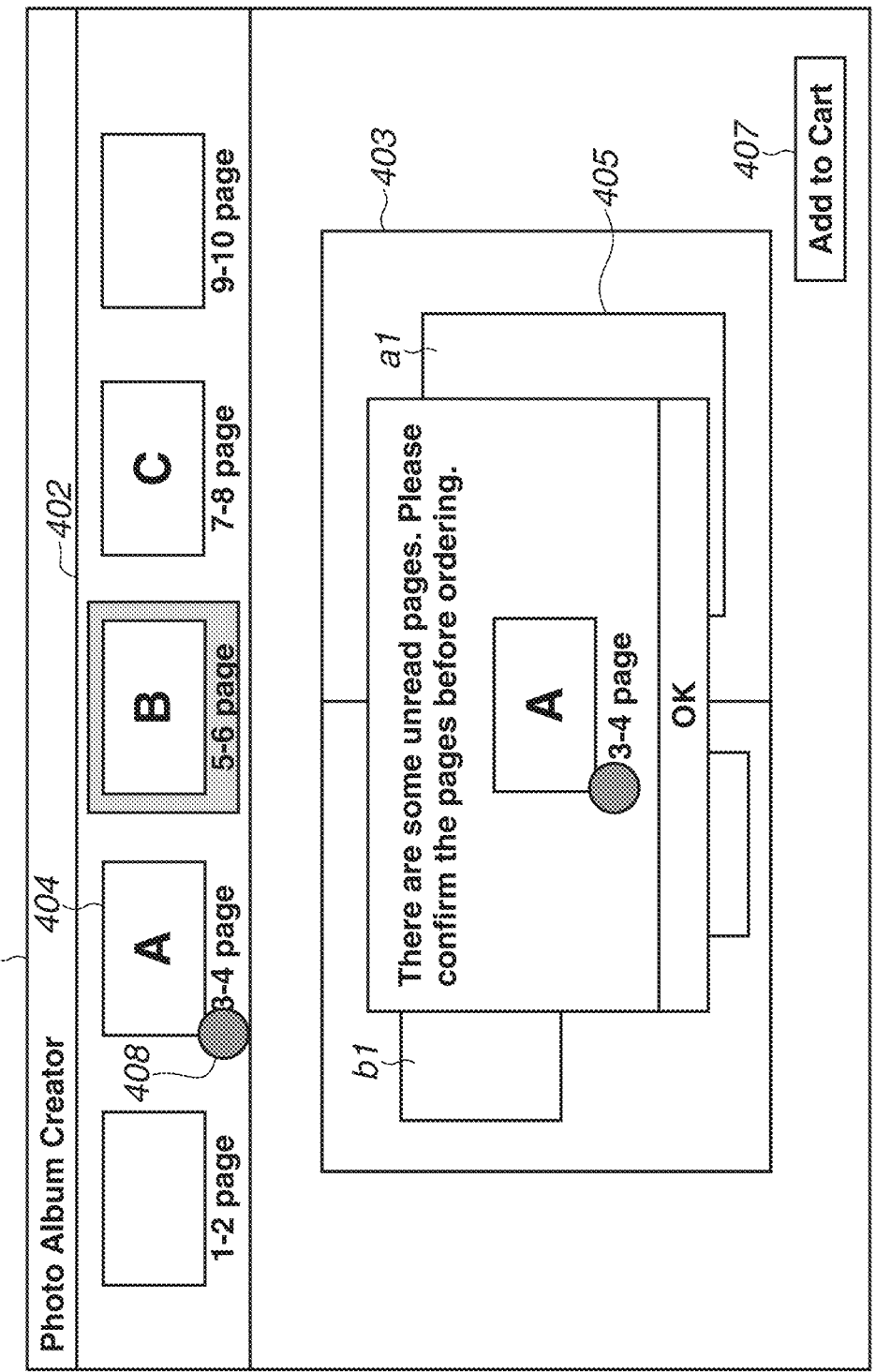

FIGS. 14A and 14B are schematic diagrams when a user selects an "Add to cart" button 407 in a state in which the spread A is unread. In FIG. 14A, the spread A is in an unread state, and thus the unread mark 408 is attached to the spread A. When the "Add to cart" button 407 is selected in this state, a warning message is displayed as illustrated in FIG. 14B. The warning message displays a message for prompting a user to confirm pages before ordering since the spread A is unread. In FIG. 14B, the thumbnail of the spread A is attached to the message to present which page is unread to a user. In FIG. 14B, when a user selects an "OK" button on the warning message, the display in the display area 403 is switched to the content of the spread A, and the user can confirm the spread A.

As described above, according to the present exemplary embodiment, the CPU 204 moves a picture as an item to a thumbnail of a predetermined page displayed in the display area 402 in response to a user's drag operation and thus can display the page in the display area 403. Accordingly, a user can easily display a desired page when there are many pages, and convenience of the user can be further improved.

According to the present exemplary embodiment, an item is directly dragged and moved to a page displayed in the display area 403, and thus the item can be arranged on the page, so that the convenience of the user can be further improved.

(Item Display Control Flow)

Figure 15:
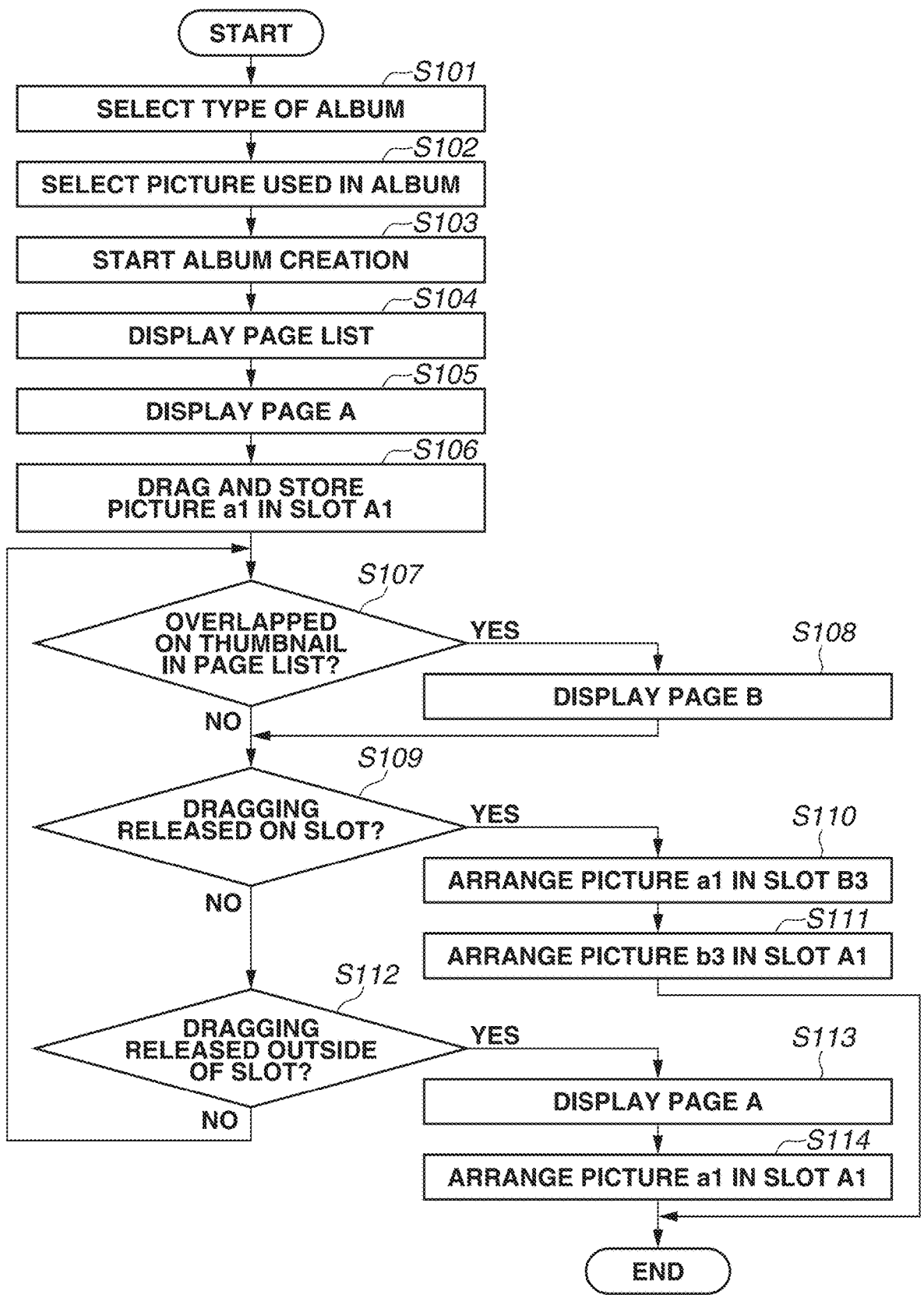
FIG. 15 is a flowchart illustrating the display controlling method.

FIG. 15 is a flowchart illustrating a display control flow regarding display of the item described with reference to FIGS. 13A to 13D. The processing in the flowchart illustrated in FIG. 15 is realized by, for example, the CPU 204 reading a program stored in the HDD 202 to the ROM 203 and the RAM 201 and executing the program.

In step S101, the CPU 204 selects and sets a type of a photo album based on an instruction from a user. The type of the photo album represents, for example, a size, the number of pages, a biding method, and a paper type of the photo album.

In step S102, the CPU 204 selects and sets a picture group to be used in an automatic layout of the photo album based on an instruction from the user. For example, when a picture is stored in a picture folder, the user selects a predetermined folder in the picture folder, and thus the CPU 204 selects a picture group in the folder as a layout target.

In step S103, the CPU 204 starts creation of the photo album. For example, the CPU 204 selects a template to which the pictures are automatically arranged and automatically arranges the pictures to slots in the template in response to the type of the photo album selected in step S101 and the picture group selected in step S102. The processing in Step S103 represents a series of flow of the automatic layout processing described with reference to FIG. 6. The embodiment automatically performing the image layout is described here, however, the present exemplary embodiment is not limited to this, and a user may manually select a template and create a photo album.

In step S104, the CPU 204 displays a thumbnail list of pages after laid out in the display area 402.

In step S105, the user selects a thumbnail corresponding to a desired page (assuming as the spread A) in the display area 402, and thus the CPU 204 displays a second page and a third page of the spread A in the display area 403. The user can manually correct the layout image as a result of the automatic layout in the screen.

In step S106, the CPU 204 drags and holds the picture a1 in the slot A1 of the spread A and moves the picture a1 based on an input of the user as illustrated in FIG. 13B.

In step S107, the CPU 204 determines whether the picture a1 being dragged as illustrated in FIG. 13C is overlapped with the thumbnail corresponding to the spread B in the display area 403. When it is determined that the picture a1 is overlapped with the thumbnail of the spread B (YES in step S107), the processing proceeds to step S108, and when the picture a1 is not overlapped with the thumbnail (NO in step S107), the processing proceeds to step S109.

In step S108, the CPU 204 displays the spread B in the display area 403. In step S108, the CPU 204 may switch the display of the page when the picture a1 is overlapped with the thumbnail of the spread B for a predetermined time length or more in step S107 instead of immediately displaying the spread B in the display area 403. This is because when the picture a1 is dragged and moved to the slot B3 from the state in FIG. 13C, the picture a1 may pass over a thumbnail of a spread C in the display area 402. In other words, only after an item is overlapped with a thumbnail of a certain page for a predetermined time length (for example, one second), the CPU 204 may switch the display to the page in the display area 403. As described above, a determination step for determining whether an item is overlapped with a thumbnail for a predetermined time length is provided, and accordingly, the CPU 204 can control display in the display area 403 not to switch when the overlapping time is less than the predetermined time length. Accordingly, if a user unintentionally passes over a thumbnail of the spread C in the display area 402 while dragging an item, the CPU 204 does not switch the display in the display area 403 to the spread C. Thus, it may less cause confusion for the user.

When a user wants to arrange the picture a1 in the slot B3 of the spread B, the user moves the picture a1 to the slot B3 of the spread B by the drag operation in a state in which the spread B is displayed in the display area 403. The CPU 204 moves the dragged picture a1 to the slot B3 of the spread B in response to the user's drag operation.

In step S109, the CPU 204 determines whether the picture a1 is released from dragging and dropped in a state in which the picture a1 is overlapped with the slot B3. When the dragging is released in the state in which the dragged picture a1 is overlapped with the slot B3 (YES in step S109) the processing proceeds to step S110, and when the dragging is not released in the state in which the dragged picture a1 is overlapped with the slot B3 (NO in step S109), the processing proceeds to step S112.

As a determination criterion of whether the picture a1 is overlapped with the slot B3, it may be determined as overlapped when the picture a1 is overlapped with the slot B3 for a predetermined amount (a predetermined area), or when a predetermined point in the picture a1 enters a predetermined area in the slot B3. Further, when a pointer dragging the picture a1 enters the slot B3, it may be determined as overlapped. Furthermore, in step S109, it is determined as YES when an overlapping time length is the predetermined time length or more, however, a determination criterion for determining as NO when the overlapping time length is less than the predetermined time length may be provided. In addition, the display of the slot may be changed so that a user can recognize that the picture a1 is overlapped with the slot B3 and ready to be arranged in the slot B3 by being dropped. For example, a frame of the slot may be thicken, or a color thereof may be changed.

In step S110, the CPU 204 arranges the picture a1 in the slot B3. In step S111, the CPU 204 arranges the picture b3 arranged in the slot B3 to the slot A1 in which the picture a1 is formerly arranged. In other words, the picture a1 and the picture b3 exchange the arrangement areas.

In step S112, the CPU 204 determines whether the dragged picture is released in an area other than the slot. When it is determined that the picture is released in the area other than the slot (YES in step S112), the processing proceeds to step S113, and when it is determined that the image is not released in the area other than the slot (NO in step S112), the processing returns to step S107. As a determination criterion in step S112, if the picture is released in a state not in contact with the slot at all, it is determined as released in the area other than the slot (YES in step S112), however, the present exemplary embodiment is not limited to this. For example, in a case where a picture is partly in contact with the slot, but a predetermined point in the picture does not exist in a predetermined area in the slot, the picture released in that state may be determined as released outside of the slot (YES in step S112).

In step S113, the CPU 204 starts cancel processing for returning the picture to the former slot. For example, when dragging of the picture a1 is released outside of the slot, the CPU 204 starts the cancel processing for returning the picture a1 to the slot A1. In step S113, the CPU 204 switches the display in the display area 403 to the former spread A.

In step S114, the CPU 204 rearranges the picture a1 in the slot A1 and completes the cancel processing.

Figure 16A:
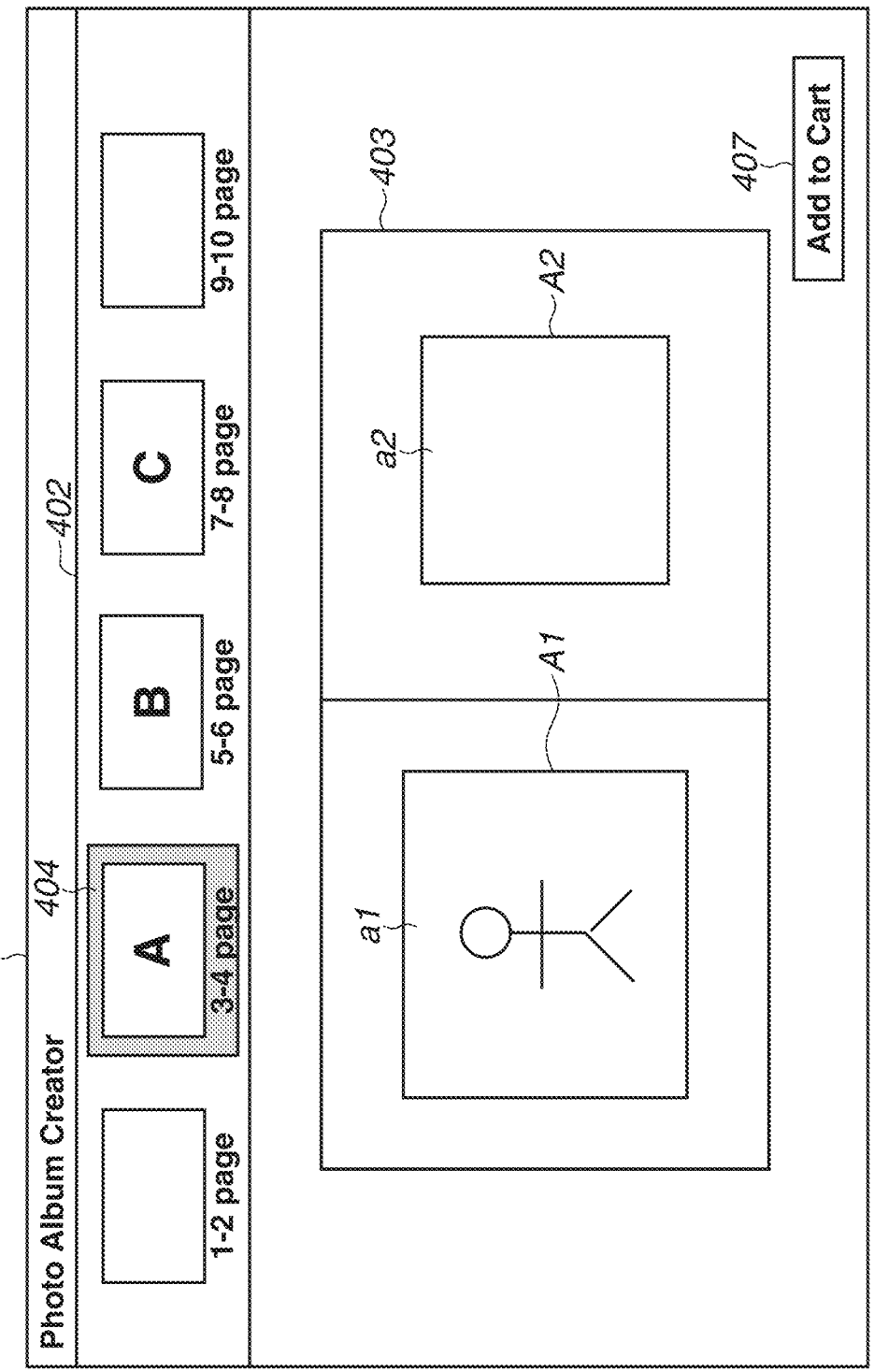
Figure 16C:
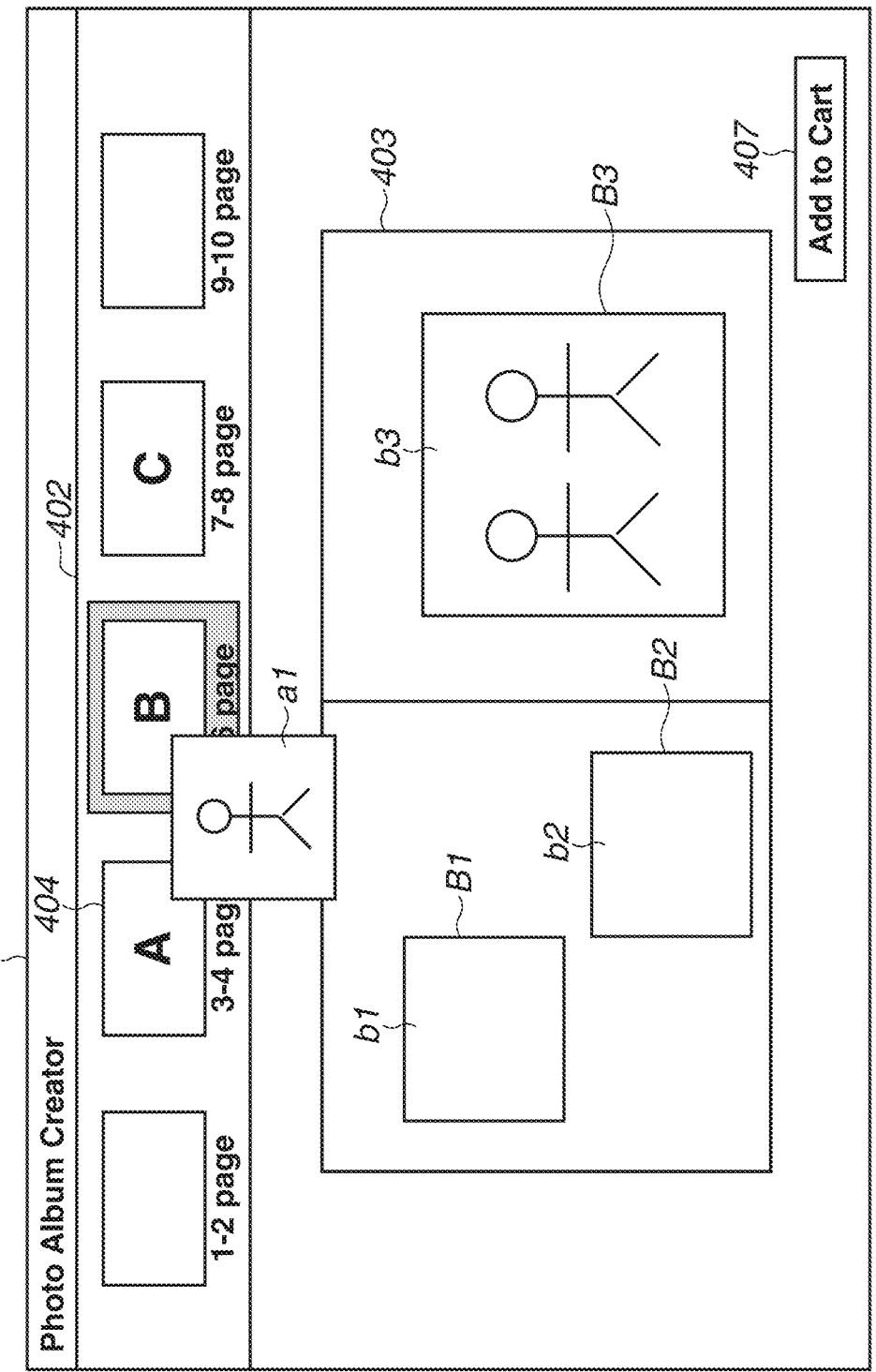
Figure 16D:
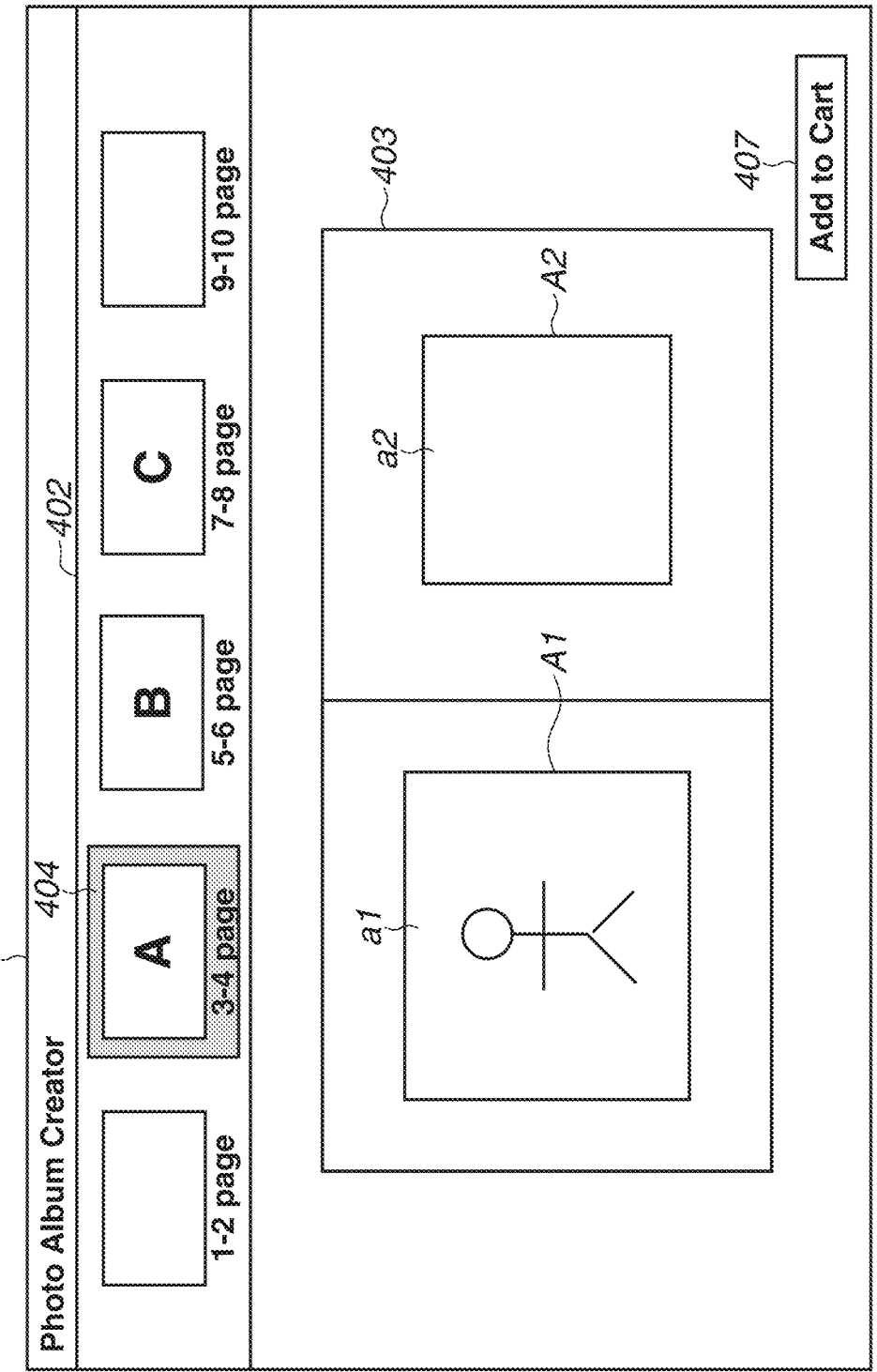

FIGS. 16A to 16D are schematic diagrams illustrating the cancel processing. FIGS. 16A to 16C are the same as FIGS. 13A to 13C, so that the descriptions thereof are omitted. FIG. 16D illustrates a case in which the dragged state is released outside of the slot after the state in FIG. 16C.

When the dragged state is released in the area other than the slot as the arrangement area in step S112, as illustrated in FIG. 16D, the CPU 204 switches the display in the display area 403 to the spread A which is the former page and rearranges the picture a1 in the slot A1 formerly arranged.

In the above-described example, the CPU 204 switches the display in the display area 403 to the former spread A in the cancel processing, however, the present disclosure is not limited to this, and the CPU 204 may rearrange the picture a1 in the slot A1 of the spread A while maintaining the display of the spread B in the display area 403.

Further, according to the above-described example, the CPU 204 can move a picture to an arbitrary page, however, the present exemplary embodiment is not limited to this, and the CPU 204 may perform control to enable movement to only a specific page. An example of application is described in a case where the application for creating an album by automatically extracting and laying out pictures which is described above with reference to FIG. 6 is used. In the case of this application, a plurality of pictures (a picture group) designated by a user is analyzed, and picture data pieces are grouped for each scene and laid out by being assigned with a page by group.

For example, it is assumed when the picture group is divided into a scene 1 and a scene 2 by the analysis of the picture data, the CPU 204 assigns the pictures in the scene 1 to the spreads A, B, and C and assigns the pictures in the scene 2 to the spreads D and E. In such a case, when the pictures of the scene 1 and the scene 2 are exchanged with each other, the pictured of the scene 2 is inserted into the scene 1, and the pictures are not arranged in chronological order, so that finishing of the album is unnatural in the layout. Thus, in order to avoid such an occurrence, the CPU 204 may perform control to enable switching of pages only in the same scene.

Figure 17:
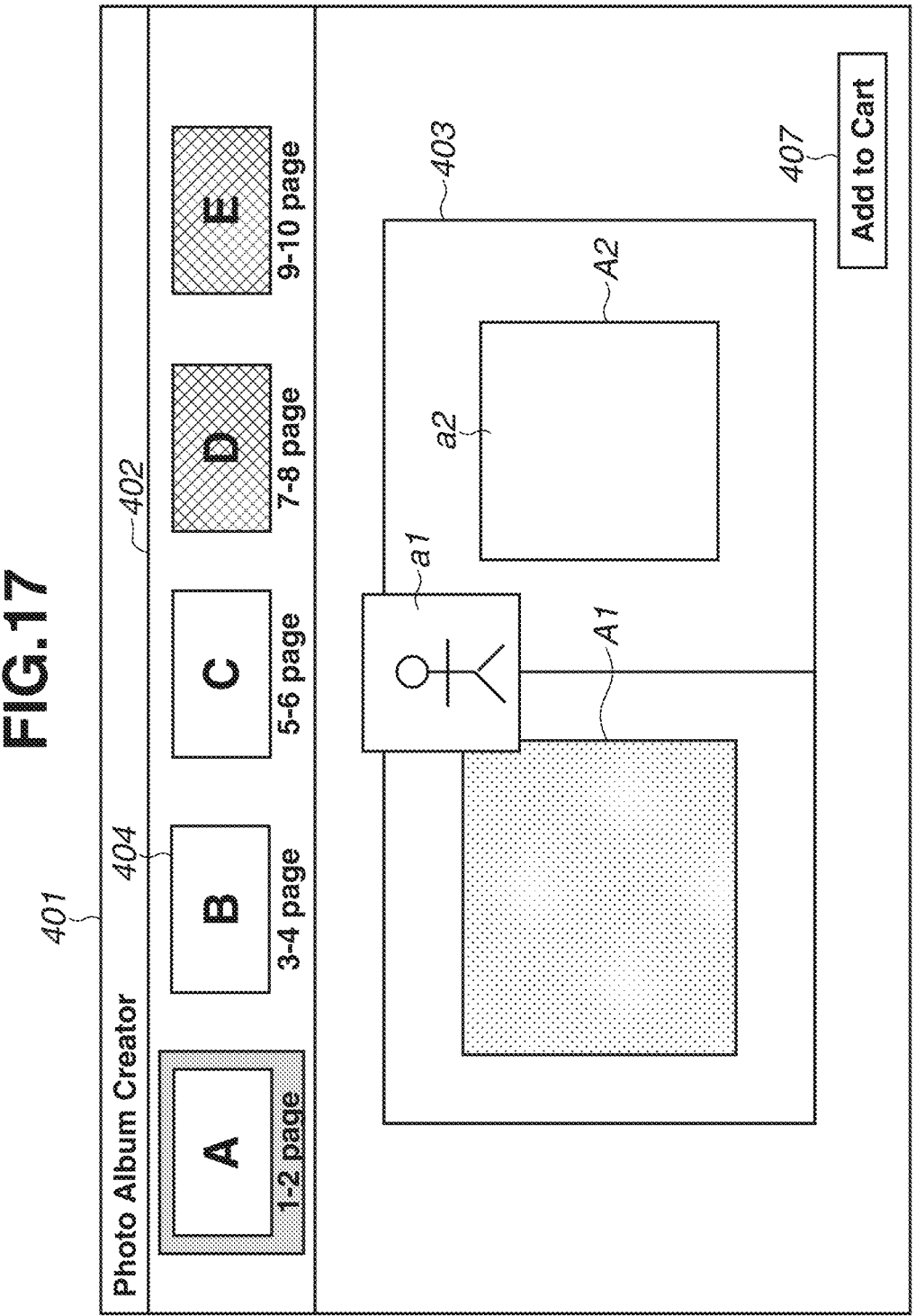
FIG. 17 is a schematic diagram illustrating the display controlling method.

FIG. 17 is a schematic diagram illustrating control of this case. In the present example, it is assumed that the pictures of the scene 1 are arranged in the spreads A, B, and C, and the pictures of the scene 2 are arranged in the spreads D and E. FIG. 17 illustrates a state in which the picture a1 in the slot A1 is held by the drag operation, and thumbnails corresponding to the spread D and the spread E are grayed out. This state indicates that the picture a1 is determined as the picture in the scene 1 and thus cannot be moved to the spreads D and E assigned with pictures in the scene 2. In this case, when the dragged picture a1 is overlapped on the spread D or E by the user operation, the CPU 204 does not display the spread D or E in the display area 403.

In FIG. 17, a page which is not a switching target is grayed out, however, only a page to which an item can be moved may be displayed in a distinguishable manner, such that the spreads A, B, and C which can be switched are highlighted. In addition, it may be configured in such a manner that the picture a1 can be arranged in the spread D or E displayed in the display area 403 in response to the user operation, however, the CPU 204 may display a warning indicating that the picture is arranged in the different scene when the picture a1 is dropped on the spread D or E.

Figure 18:
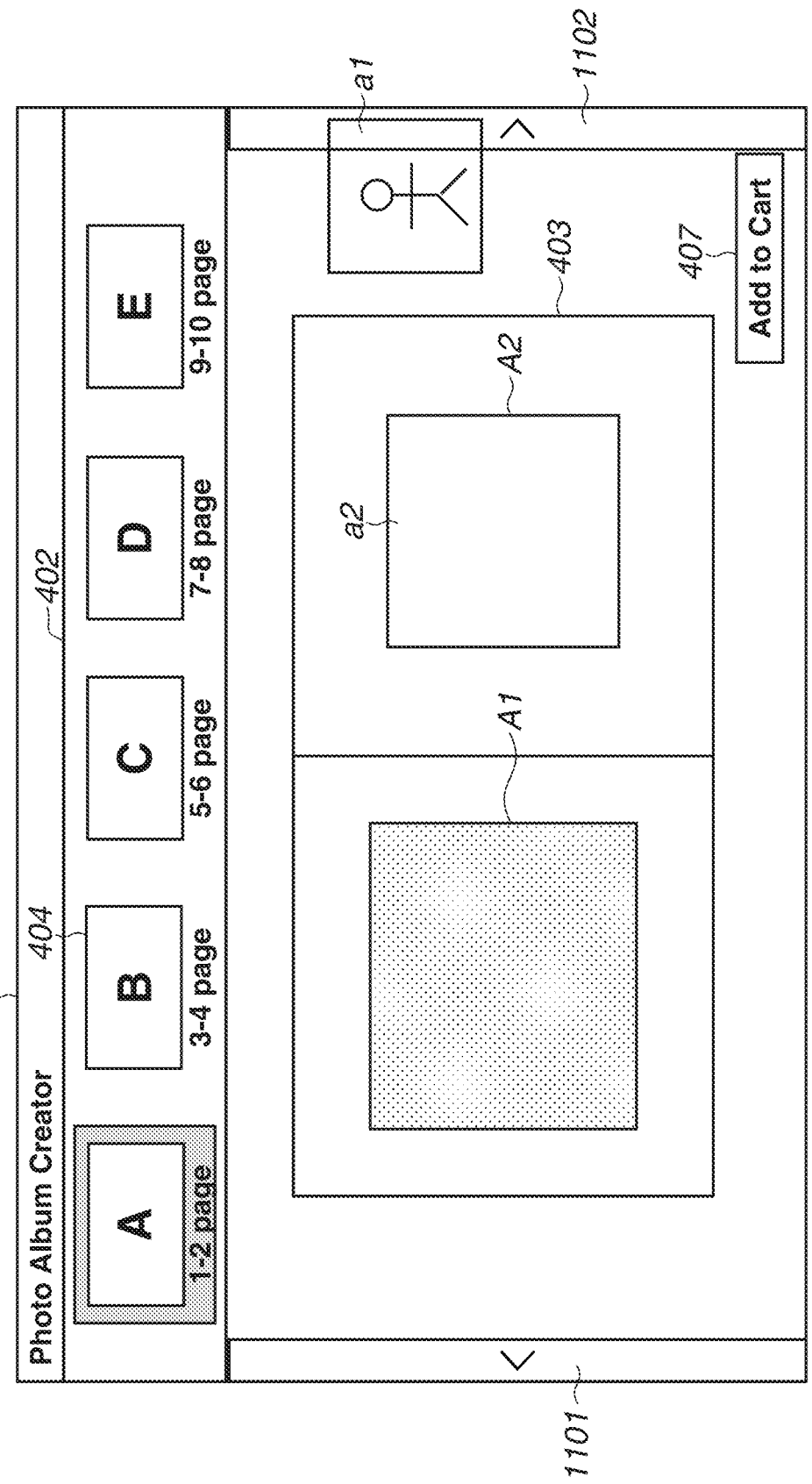
FIG. 18 is a schematic diagram illustrating the display controlling method.

In the control described in FIG. 15, the display in the display area 403 is switched when a picture is overlapped on the thumbnail of each page in the display area 402, however, switching of a page according to the present exemplary embodiment is not limited to the above-described one. In addition to the above-described page switching method, as illustrated in FIG. 18, a method for switching by a button 1101 for switching display to a previous page and a button 1102 for switching display to a following page 1102 may be used. When the dragged picture a1 is overlapped with an area of the switching button 1101 or 1102, the CPU 204 can sequentially switch the display in the display area 402. A page can be switched using the switching buttons 1101 and 1102 by not only the drag operation of the picture a1 but also a tap or a click operation thereon.

According to the present exemplary embodiment, it is not necessary to display thumbnails of all pages in the display area 402. For example, when there are many pages, and all thumbnails cannot be displayed, thumbnail display may be switched by overlapping a dragged picture with a left edge portion 1201 or a right edge portion 1202 of the display area 402 as illustrated in FIGS. 19A and 19B. In FIG. 19A, when the dragged picture a1 is overlapped with the right edge portion 1202, the CPU 204 switches the display of the thumbnail list in the display area 402 as illustrated in FIG. 19B. Accordingly, when a user overlaps, for example, the dragged picture a1 with a thumbnail of a spread G, the display in the display area 403 is switched to the spread G.

Further, according to the above-described example, when one item is moved, slots are exchanged with a different item, however, the present exemplary embodiment is not limited to the example and may perform control to simply move one item. For example, in FIG. 13C, when the picture a1 is dropped at an arbitrary position on the spread B based on the user operation after switching the display in the display area 403 to the spread B, the CPU 204 may insert the picture a1 to the dropped position. In other words, when the picture a1 is dropped at an area other than the slot set in the page, the CPU 204 may arrange the picture a1 in the relevant area (the area other than the slot). In this case, the CPU 204 may lay out the spread B again in response to addition of the picture a1 to the spread B. In other words, the CPU 204 may change the layout, such as to reduce a display size of the picture b3 already arranged in response to insertion of the picture a1. In addition, when the picture a1 is arranged in the spread B, the CPU 204 may delete the slot A1 from the spread A. In this case, the CPU 204 may not only delete the slot A1 from the spread A but also change the layout of the spread A, such as to change a display size of the picture already arranged in the spread A.

Further, according to the above-described example, only one item is moved, however, the present exemplary embodiment is not limited to the example, and pictures in a plurality of slots may be moved at the same time. For example, the picture a1 in the slot A1 and a picture a2 in a slot A2 of the spread A are dragged and moved to the thumbnail of the spread B, and thus the CPU 204 may change the display to the spread B. Further, the CPU 204 may perform control to arrange the picture a1 and the picture a2 in the spread B when the picture a1 and the picture a2 are dropped on the spread B.

Further, according to the above-described example, the thumbnails are separated in unit of spread and displayed in a list in the display area 402, and each spread is displayed in the display area 403, however, the present exemplary embodiment is not limited to this. The thumbnail in the display area 402 may be displayed as a list of each separated page, and each page is displayed in the display area 403.

Further, according to the above-described example, a picture after laid out is moved as an item, the present exemplary embodiment is not limited to this example. A display item may include an image other than a picture, a text box, an operation button, an application icon, a shortcut, a content, and a stamp. For example, the application icon can often be arranged in a plurality of pages. Accordingly, the present disclosure can be realized by an embodiment which includes a display area for displaying these pages in a list of thumbnails and switches display to a desired page by overlapping the item on the thumbnail.

Further, according to the above-described exemplary embodiment, a terminal device such as a smartphone and a tablet terminal is described as an example of the information processing apparatus 1, however, the present disclosure can be realized by other apparatuses. For example, a PC and an image processing apparatus such as a printer may be adopted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, a user can easily display a desired page when moving an item to an arbitrary page, and thus the convenience of the user can be further improved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-016211, filed Jan. 31, 2017, which is hereby incorporated by reference herein in its entirety.

What is claimed is:

1. An information processing apparatus comprising:
at least one processor configured to cause the information processing apparatus to act as:
a layout unit configured to generate a plurality of pages including a first page in which a first image is arranged in a first slot and a second page in which a second image is arranged in a second slot,
a display control unit configured to display a plurality of thumbnails corresponding to the plurality of pages in a first display area, and display, in a second display area, the first page corresponding to a thumbnail selected from the thumbnails displayed in the first display area; and
a movement control unit configured to move an image in response to a drag operation,
wherein, in a case where the first image arranged in the first page displayed in the second display area is moved to a thumbnail that corresponds to the second page and is displayed in the first display area, the second page is displayed in the second display area, and
wherein, in a case where the first image is moved to the second page in the second display area from the thumbnail corresponding to the second page and then the drag operation of the first image is released on the second slot in the second page, the first image is arranged in the second slot of the second page and the second image is arranged in the first slot of the first page.

2. The information processing apparatus according to claim 1, wherein the display control unit displays thumbnails of a plurality of pages in a list by separating in unit of spread, and in a case where a thumbnail corresponding to the first page is selected, displays a spread including the first page and a page next to the first page in the second display area.

3. The information processing apparatus according to claim 1, wherein the first page and the second page are each included in different spreads.

4. The information processing apparatus according to claim 1, wherein the display control unit displays the second page in the second display area in a case where a time length in which the first image is overlapped with a thumbnail of the second page is greater than or equal to a predetermined time length and does not display the second page in the second display area in a case where a time length in which the first image is overlapped with the thumbnail of the second page is less than the predetermined time length.

5. The information processing apparatus according to claim 1, wherein in a case where the movement control unit moves the first image from the first page to a thumbnail corresponding to a third page in the plurality of pages, the display control unit does not display the third page in the second display area,
wherein a scene of an image arranged in the first page is different from a scene of an image arranged in the third page.

6. The information processing apparatus according to claim 1, wherein a predetermined mark is displayed for the thumbnail corresponding to the first page while the first page is not displayed in the second display area again after the first image is arranged in the second slot and the second image is arranged in the first slot.

7. The information processing apparatus according to claim 6, wherein a message is displayed to prompt a user to confirm a page on which the predetermined mark is displayed in a case where the user gives a predetermined instruction while the predetermined mark is displayed.

8. A method for controlling display comprising:
generating a plurality of pages including a first page in which a first image is arranged in a first slot and a second page in which a second image is arranged in a second slot,
displaying a plurality of thumbnails corresponding to the plurality of pages in a first display area;
displaying, in a second display area, the first page corresponding to a thumbnail selected from the thumbnails displayed in the first display area; and
moving an image in response to a drag operation,
wherein, in a case where the first image arranged in the first page displayed in the second display area is moved to a thumbnail that corresponds to the second page and is displayed in the first display area, the second page is displayed in the second display area, and
wherein, in a case where the first image is moved to the second page in the second display area from the thumbnail corresponding to the second page and then the drag operation of the first image is released on the second slot in the second page, the first image is arranged in the second slot of the second page and the second image is arranged in the first slot of the first page.

9. The method according to claim 8, further comprising:
displaying thumbnails of a plurality of pages in a list by separating in unit of spread; and
displaying, in a case where a thumbnail corresponding to the first page is selected, a spread including the first page and a page next to the first page in the second display area.

10. The method according to claim 8, wherein the first page and the second page are each included in different spreads.

11. The method according to claim 8, further comprising displaying the second page in the second display area in a case where a time length in which the first image is overlapped with a thumbnail of the second page is greater than or equal to a predetermined time length and not displaying the second page in the second display area in a case where a time length in which the first image is overlapped with the thumbnail of the second page is less than the predetermined time length.

12. The method according to claim 8, further comprising, in a case where the first image is moved from the first page to a thumbnail corresponding to a third page in the plurality of pages, not displaying the third page in the second display area,
    wherein a scene of an image arranged in the first page is different from a scene of an image arranged in the third page.

13. The method according to claim 8, wherein a predetermined mark is displayed for the thumbnail corresponding to the first page while the first page is not displayed in the second display area again after the first image is arranged in the second slot and the second image is arranged in the first slot.

14. The method according to claim 13, wherein a message is displayed to prompt a user to confirm a page on which the predetermined mark is displayed in a case where the user gives a predetermined instruction while the predetermined mark is displayed.

15. A non-transitory computer-readable storage medium storing a program causing a computer to execute a method, the method comprising:
    generating a plurality of pages including a first page in which a first image is arranged in a first slot and a second page in which a second image is arranged in a second slot,
    displaying a plurality of thumbnails corresponding to the plurality of pages in a first display area;
    displaying, in a second display area, the first page corresponding to a thumbnail selected from the thumbnails displayed in the first display area; and
    moving an image in response to a drag operation,
    wherein, in a case where the first image arranged in the first page displayed in the second display area is moved to a thumbnail that corresponds to the second page and is displayed in the first display area, the second page is displayed in the second display area, and
    wherein, in a case where the first image is moved to the second page in the second display area from the thumbnail corresponding to the second page and then the drag operation of the first image is released on the second slot in the second page, the first image is arranged in the second slot of the second page and the second image is arranged in the first slot of the first page.

* * * * *